United States Patent
Chatterjee et al.

(10) Patent No.: US 10,292,143 B2
(45) Date of Patent: May 14, 2019

(54) METHODS, APPARATUSES, AND SYSTEMS FOR ENHANCEMENT OF EVOLVED PHYSICAL DOWNLINK CONTROL CHANNEL FOR MACHINE TYPE COMMUNICATIONS

(71) Applicant: Intel IP Corporation, Santa Clara, CA (US)

(72) Inventors: Debdeep Chatterjee, Mountain View, CA (US); Gang Xiong, Beaverton, OR (US); Gi Wan Choi, San Jose, CA (US); Seunghee Han, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 31 days.

(21) Appl. No.: 14/828,071

(22) Filed: Aug. 17, 2015

(65) Prior Publication Data

US 2016/0302174 A1    Oct. 13, 2016

Related U.S. Application Data

(60) Provisional application No. 62/145,378, filed on Apr. 9, 2015.

(51) Int. Cl.
*H04W 72/04* (2009.01)
*H04W 72/06* (2009.01)
(Continued)

(52) U.S. Cl.
CPC ........ *H04W 72/042* (2013.01); *H04B 7/0486* (2013.01); *H04W 72/0446* (2013.01); *H04W 72/06* (2013.01); *H04L 5/003* (2013.01)

(58) Field of Classification Search
CPC .......... H04W 72/042; H04W 72/0446; H04W 72/06; H04L 5/003; H04B 7/0486
See application file for complete search history.

(56) References Cited

U.S. PATENT DOCUMENTS

2013/0039284 A1* 2/2013 Marinier ............... H04L 5/001
                                                                     370/329
2013/0242882 A1* 9/2013 Blankenship ....... H04W 72/042
                                                                     370/329
(Continued)

FOREIGN PATENT DOCUMENTS

WO    WO 2014165678 A2 *  10/2014  .......... H04L 5/0053
WO    2016/018526 A1     2/2016
WO    2016/073762 A1     5/2016

OTHER PUBLICATIONS

Ericsson et al., "New WI proposal: Further LTE Physical Layer Enhancements for MTC," 3GPP TSG RAN Meeting #65, RP-141660, Agenda Item: 14.1.1, Sep. 9-12, 2014, Edinburgh, Scotland, 9 pages.

(Continued)

*Primary Examiner* — Alex Skripnikov
*Assistant Examiner* — Sharmin Chowdhury
(74) *Attorney, Agent, or Firm* — Schwabe, Williamson & Wyatt, P.C.

(57) ABSTRACT

Methods, systems, and storage media for monitoring enhanced physical downlink control channel (EPDCCH)-physical resource block (PRB) sets are described. In embodiments, an apparatus may determine a control channel configuration that indicates one or more EPDCCH-PRB sets to be monitored in a desired subframe. The apparatus may determine a control channel configuration that indicates an EPDCCH to be monitored for one or more EPDCCH transmissions in a non-UE-specific search space (SS) in one or more subframes. The apparatus may determine a control (Continued)

channel configuration that indicates a non-UE-specific search space (SS) to monitor for EPDCCH transmissions using one or more aggregation levels. The apparatus may monitor the EPDCCH according to one or more of the control channel configurations. Other embodiments may be described and/or claimed.

25 Claims, 9 Drawing Sheets

(51) Int. Cl.
*H04B 7/0456* (2017.01)
*H04L 5/00* (2006.01)

(56) References Cited

U.S. PATENT DOCUMENTS

| | | | | |
|---|---|---|---|---|
| 2013/0301611 A1* | 11/2013 | Baghel | ................. | H04W 72/04 370/331 |
| 2014/0086192 A1* | 3/2014 | Kim | ................... | H04W 72/042 370/329 |
| 2015/0110031 A1* | 4/2015 | Takeda | ............... | H04W 72/042 370/329 |
| 2015/0131579 A1* | 5/2015 | Li | ........................ | H04L 1/0072 370/329 |
| 2015/0280876 A1* | 10/2015 | You | ...................... | H04L 5/0048 370/329 |
| 2016/0037514 A1 | 2/2016 | Xiong et al. | | |
| 2016/0088604 A1* | 3/2016 | Patel | .................... | H04L 5/0053 370/336 |
| 2016/0112997 A1* | 4/2016 | Chen | ...................... | H04W 4/70 370/329 |
| 2016/0286580 A1* | 9/2016 | Liu | ....................... | H04W 4/005 |

OTHER PUBLICATIONS

3GPP, "Technical Specification Group Radio Access Network; Evolved Universal Terrestrial Radio Access (E-UTRA); Physical channels and modulation (Release 12)," 3GPP TS 36.211 V12.5.0 (Mar. 2015), Lte Advanced, 136 pages.
3GPP, "Technical Specification Group Radio Access Network; Evolved Universal Terrestrial Radio Access (E-UTRA); Physical layer procedures (Release 12)," 3GPP TS 36.213 V12.5.0 (Mar. 2015), Lte Advanced, 239 pages.
International Search Report and Written Opinion dated Jun. 28, 2016 from International Application No. PCT/US2016/016425, 19 pages.
LG Electronics, "(E) PDCCH related issues for low-cost MTC," 3GPP TSG RAN WG1 Meeting #76bis, R1-141333, Agenda Item: 7.2.2.1, Mar. 31-Apr. 4, 2014, Shenzhen, China, 4 pages.
Intel Corporation, "Coverage Improvement for (E)PDCCH and PUCCH," 3GPP TSG-RAN WG1 #76, R1-140116, Agenda Item: 7.2.2.2.3, Feb. 10-14, 2014, Prague, Czech Republic, 7 pages.
Partial International Search Report dated Apr. 21, 2016 from International Application No. PCT/US2016/016425, 9 pages.

* cited by examiner

METHODS, APPARATUSES, AND SYSTEMS FOR ENHANCEMENT OF EVOLVED PHYSICAL DOWNLINK CONTROL CHANNEL FOR MACHINE TYPE COMMUNICATIONS

RELATED APPLICATIONS

The present application claims priority under 35 U.S.C. § 119 to U.S. Provisional Application No. 62/145,378, filed on Apr. 9, 2015, which is hereby incorporated by reference in its entirety.

FIELD

Implementations of the claimed invention generally relate to the field of wireless communications, and in particular, utilizing control channels in Long Term Evolution (LTE) wireless communications networks.

BACKGROUND

Machine-Type Communication (MTC) is a promising and emerging technology that may enable a ubiquitous computing environment towards the concept of the "Internet of Things" (IoT). These MTC devices may require little to no human interaction and may be able to communicate captured data over wireless networks. Potential MTC based applications and services include smart metering, healthcare monitoring, remote security surveillance, intelligent transportation monitoring systems, supply chain monitoring, and/or the like. Some projections indicate that the number of deployed MTC devices may exceed one billion in the near future. However, network resources of existing mobile broadband networks may be burdened by the numerous data transmissions being communicated by the numerous MTC devices in addition to the numerous data transmissions being communicated by human operated mobile communication devices, such as smartphones and tablet personal computers. Furthermore, power consumption and computational resources may be taxed as human operated mobile communication devices and MTC devices compete for a limited amount of bandwidth for communicating data.

Most existing mobile broadband networks were designed to optimize performance mainly for mobile communication devices that are operated by humans. Therefore, the existing mobile broadband networks are typically not designed to meet the MTC related requirements. Network designs that contemplate the deployment of MTC devices are being studied by the 3rd Generation Partnership Project (3GPP) Radio Access Network (RAN) working groups (WGs) for specification support in Release-13 LTE specifications, wherein the primary objective is to focus on lowering device costs, enhancing coverage, and reducing power consumption.

To further reduce costs and power consumption, it has been suggested to reduce the transmission bandwidth for MTC devices to 1.4 megahertz (MHz), which is the minimum bandwidth of most existing LTE networks. In this case, the transmission bandwidth for both control and data channels can be reduced to 1.4 MHz. In general, it is envisioned that a relatively large number of MTC devices will be deployed for specific services within a single cell coverage area being serviced by a single base station or evolved NodeB (eNB). When a relatively large number of MTC devices within the single cell coverage area attempt to access and communicate with the network, multiple MTC regions within the 1.4 MHz bandwidth can be allocated by the eNB. Therefore, new mechanisms may be required to allocate multiple MTC regions within the 1.4 MHz bandwidth and/or schedule multiple MTC transmissions within the 1.4 MHz bandwidth.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
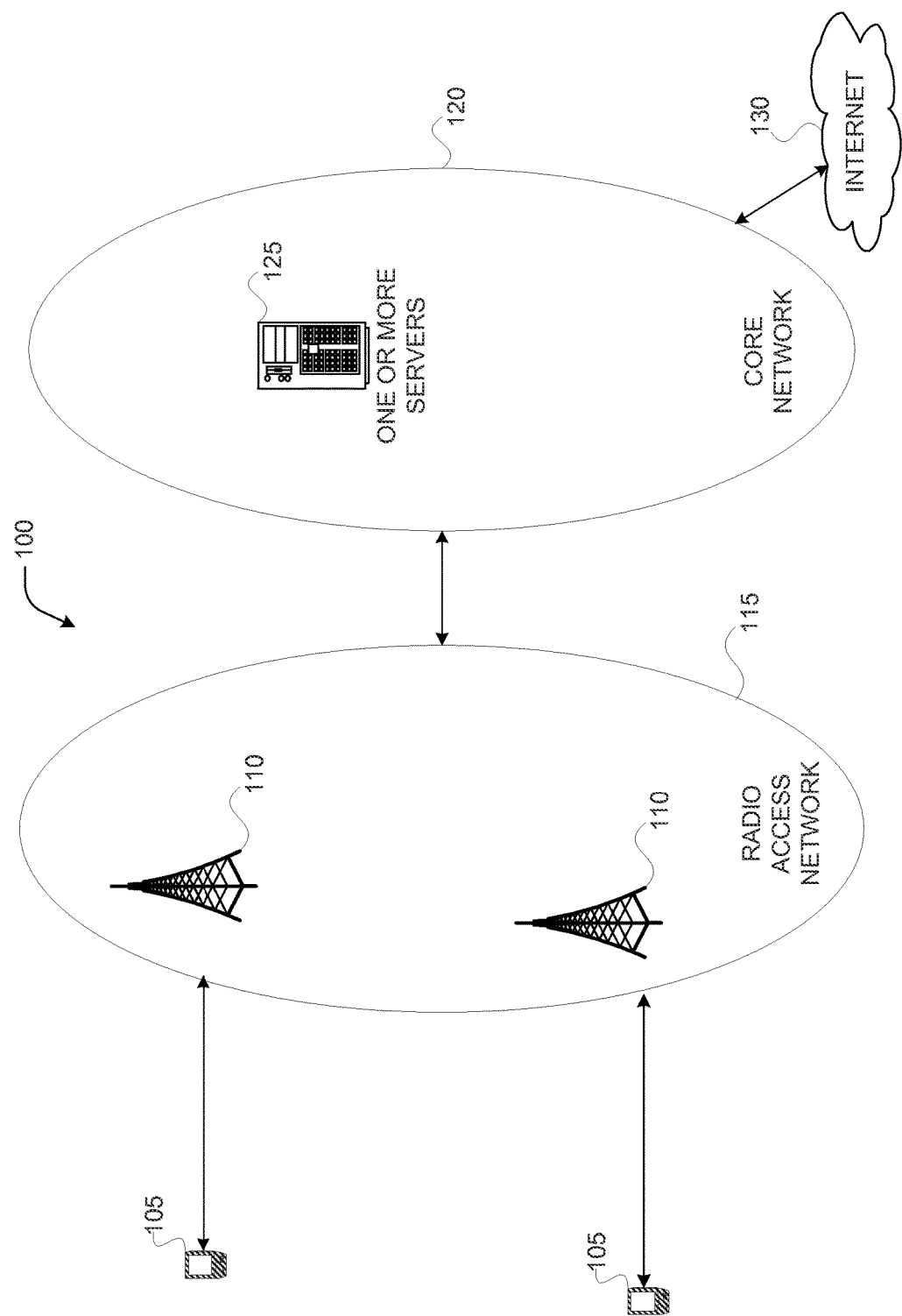
FIG. 1 illustrates a broadband wireless access (BWA) network in accordance with various example embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments", "in some embodiments", and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B". For the purposes of the present disclosure, the phrase "at least one of A and B" means (A), (B), or (A and B). The description may use the phrases "in an embodiment", "in embodiments", "in some embodiments," and/or "in various embodiments," which may each refer to one or more of the same or different embodiments. Furthermore, the terms "comprising," "including," "having," and the like, as used with respect to embodiments of the present disclosure, are synonymous.

It should be noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality. Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc. that perform particular tasks or implement particular data types.

The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "user equipment" may be considered synonymous to, and may hereafter be occasionally referred to, as a client, mobile, mobile device, mobile terminal, user terminal, mobile unit, mobile station, mobile user, UE, subscriber, user, remote station, access agent, user agent, receiver, etc., and may describe a remote user of network resources in a communications network. Furthermore, the term "user equipment" may include any type of wireless/wired device such as consumer electronics devices, cellular phones, smart phones, tablet personal computers, wearable computing devices, personal digital assistants (PDAs), desktop computers, and laptop computers, for example.

As used herein, the term "network element", may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and configured to host a virtual machine. Furthermore, the term "network element" may describe equipment that provides radio baseband functions for data and/or voice connectivity between a network and one or more users. The term "network element", may be considered synonymous to and/or referred to as a "base station". As used herein, the term "base station", may be considered synonymous to and/or referred to as a Node B, an enhanced or evolved Node B (eNB), base transceiver station (BTS), access point, etc. and may describe equipment that provides the radio baseband functions for data and/or voice connectivity between a network and one or more users.

It should also be noted that the term "channel" as used herein may refer to any transmission medium, either tangible or intangible, which is used to communicate data or a data stream. Additionally, the term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated.

Embodiments herein relate to the allocation and/or scheduling of enhanced physical downlink control channel (EPDCCH) transmissions for machine type communication (MTC) devices and/or MTC user equipment (UE), which may also be referred to as an MTC physical downlink control channel (M-PDCCH). The example embodiments provide the following advantages: reduced bandwidth support for the MTC UEs; complexity reduction for MTC UEs receiving EPDCCH transmissions; coverage enhancement support for the EPDCCH and the physical downlink shared channel (PDSCH); and support control channel configurations of UE-specific search space (SS) for EPDCCH transmissions for MTC UEs operating in a normal coverage mode and an enhanced coverage mode.

In order to achieve at least some of the aforementioned advantages, various example embodiments provide that MTC UEs do not need to monitor more than one EPDCCH-physical resource block (PRB)-set in a subframe. By contrast, according to current specifications, an EPDCCH configuration provides a UE with two EPDCCH-PRB-sets to monitor. Various example embodiments provide that, if multiple EPDCCH-PRB sets are configured for a UE-specific SS, the UE may be expected to monitor one of the two EPDCCH-PRB sets on each subframe wherein an association of an EPDCCH-PRB set to each set of non-overlapping subframes is based on a hashing function that is at least a function of a cellular radio network temporary identifier (C-RNTI) associated with the UE.

Various example embodiments provide that, if a non-UE-specific SS (also referred to as a "common search space") is defined for a UE, then the two EPDCCH-PRB sets may be configured such that a first EPDCCH-PRB set of the two EPDCCH-PRB sets corresponds to an EPDCCH UE-specific SS for the UE and a second EPDCCH-PRB set of the two EPDCCH-PRB sets corresponds to the EPDCCH non-UE-specific SS. In some embodiments, a UE may be expected to monitor only a single EPDCCH-PRB-set in a single subframe, which corresponds either to the UE-specific SS or the non-UE-specific SS for the EPDCCH.

Various example embodiments provide that an association of EPDCCH-PRB sets to subframes may be defined based on a granularity of X subframes, wherein X≥1 and includes a retuning time needed for an MTC UE to switch from one narrowband (spanning 1.4 MHz) to another narrowband within a larger system bandwidth.

Various example embodiments provide that details and/or information pertaining to a non-UE-specific SS configuration, including a use of the non-UE-specific SS to indicate the EPDCCH configuration, may be used for the UE-specific SS.

Various example embodiments provide that enhancements to channel estimation on the EPDCCH and demodulation reference signal (DM-RS)-based PDSCH (for example, transmission mode (TM) 9 and/or TM 10) may be accomplished by specifying PRB bundling of up to six (6) PRBs and/or by restricting usage of a same precoding across one or more subframes within a set of repeated transmissions that correspond to the same frequency locations.

Various example embodiments provide that enhancements to support transmissions of EPDCCH occupying six (6) PRB-pairs.

FIG. 1 illustrates an example of a broadband wireless access (BWA) network 100, according to an example embodiment. BWA network 100 includes two UEs 105, two eNBs 110, a radio access network (RAN) 115, core network (CN) 120 including one or more servers 125, and internet 130. The following description is provided for an example BWA network 100 that operates in conjunction with the Long Term Evolution (LTE) standard as provided by 3rd Generation Partnership Project (3GPP) technical specifications. However, subject matter of the present disclosure is not limited in this regard and the described embodiments may apply to other networks that benefit from the principles described herein.

Referring to FIG. 1, each of the UEs 105 (collectively referred to as "UE 105") may be physical hardware devices capable of running one or more applications and capable of accessing the core internet 130 via a radio link ("link") with an eNB 110, in the RAN 115. UEs 105 may include a transmitter/receiver (or alternatively, a transceiver), memory, one or more processors, and/or other like components. UE 105 may be configured to send/receive data to/from the eNB 110 via the link. UE 105 may be designed to sequentially and automatically carry out a sequence of arithmetic or logical operations; equipped to record/store digital data on a machine readable medium; and transmit and receive digital data via base station 110. The wireless transmitter/receiver (or alternatively, a transceiver) included in the UE 105 may be configured to operate in accordance with one or more wireless communications protocols and/or one or more cellular phone communications protocols, such as 3GPP LTE, 3GPP LTE-Advanced (LTE-A), and/or any other wireless communication protocols, including RF-based, optical (visible/invisible), and so forth.

In various embodiments, UEs 105 may include wireless phones or smartphones, laptop personal computers (PCs), tablet PCs, wearable computing devices, and/or any other physical or logical device capable of recording, storing, and/or transferring digital data to/from eNB 110 and/or any other like network element.

In various embodiments, UEs 105 may be MTC devices. In embodiments where the UEs 105 are MTC devices, the UEs 105 may be referred to as "MTC UEs 105", "low complexity (LC) UEs 105", "LC MTC UEs 105", a "UE 105 with reduced bandwidth support", and the like. However, as used herein the term "UE" may be interchangeable with "MTC UE", "MTC device", and the like. MTC UEs 105 may be any device that requires little (or no) human intervention to communicate with another device, such as an eNB 110. MTC UEs 105 may be autonomous or semi-autonomous sensors, meters, or other like devices that can capture and/or record an event (for example, temperature, electrical output, water usage, inventory level, blood sugar levels, heart rate and/or pulse, and the like).

The MTC UEs 105 may include an MTC application configured to capture and record event-related data, and relay the data through the BWA network 100 to be reported to an MTC application within an MTC server or other like device. Data sent by the MTC UEs 105 may be referred to as "small data payloads", "small data payload transmissions", "small data transmissions", and the like. MTC devices may also be configured to receive data requests from an MTC server, wherein the data requests are relayed through the BWA network 100. The data requests may be referred to as "triggers", "trigger messages", "trigger requests", and the like. The MTC UEs 105 may also be re-configured autonomously such that an MTC UE 105 may re-configure themselves by receiving control data from an eNB 110 and/or from an MTC server. The MTC UEs 105 may be configured to communicate data within a transmission bandwidth of 1.4 megahertz (MHz) at radiofrequency (RF) and/or baseband.

Referring back to FIG. 1, eNB 110 is a hardware computing device configured to provide wireless communication services to mobile devices (for example, UEs 105) within a geographic area or cell coverage area associated with eNB 110. The cell coverage area may also be referred to as a "serving cell." The eNB 110 may provide wireless communication services to UE 105 via a link for each UE 105. Links between eNB 110 and a UE 105 may include one or more downlink (or forward) channels for transmitting information from eNB 110 to UE 105 and one or more uplink (or reverse) channels for transmitting information from UE 105 to the eNB 110. The channels may include the physical downlink shared channel (PDSCH), physical downlink control channel (PDCCH), physical hybrid automatic repeat request (HARM) indicator channel (PHICH), physical control format indicator channel (PCFICH), physical broadcast channel (PBCH), physical uplink shared channel (PUSCH), physical uplink control channel (PUCCH), physical random access channel (PRACH), and/or any other like communications channels or links used to transmit/receive data.

In various embodiments, eNBs 110 include a transmitter/receiver (or alternatively, a transceiver) connected to one or more antennas, one or more memory devices, one or more processors, and/or other like components. The one or more transmitters/receivers may be configured to transmit/receive data signals to/from one or more UEs 105 within its cell coverage area via one or more links that may be associated with a transmitter and a receiver. In various embodiments, when BWA network 100 employs the LTE or LTE-A standard, eNBs 110 may employ Evolved Universal Terrestrial Radio Access (E-UTRA) protocols, for example, using orthogonal frequency-division multiple access (OFDMA) for downlink communications and single carrier frequency-division multiple access (SC-FDMA) for uplink communications.

Referring back to FIG. 1, eNBs 110 may be part of a RAN 115. In embodiments where communications network 100 employs the LTE standard, the RAN 115 may be referred to as an evolved UMTS Terrestrial Radio Access Network (E-UTRAN). RANs and their typical functionality are generally well-known, and thus, a further detailed description of the typical functionality of RAN 115 is omitted.

Referring to FIG. 1, CN 120 may include one or more hardware devices, such as the one or more servers 125, which provide various telecommunications services to the UEs 105. In embodiments where communications network 100 employs the LTE standards, the one or more servers 125 of the CN 120 may comprise components of the System Architecture Evolution (SAE) with an Evolved Packet Core (EPC) as described by 3GPP technical specifications. In such embodiments, the one or more servers 125 of the CN 120 may include components such as a node including a mobility management entity (MME) and/or a serving General Packet Radio Service Support Node (SGSN) (which may be referred to as an "SGSN/MME"), serving gateway (SGW), packet data network (PDN) gateway (PGW), home subscriber server (HSS), access network discovery and selection function (ANDSF), evolved packet data gateway (ePDG), an MTC interworking function (IWF), and/or other like components as are known. Because the components of the SAE core network and their functionality are generally well-known, a further detailed description of the SAE core network is omitted. It should also be noted that the aforementioned functions may be provided by the same physical hardware device or by separate components and/or devices.

Internet 130 may be any network that allows computers to exchange data. Internet 130 may include one or more network elements (not shown) capable of physically or logically connecting computers. Protocols and components for communicating via such a network are well known and will not be discussed herein in detail. Communication over the internet 130 may be enabled by wired or wireless connections, and combinations thereof. It should be noted that an application server (not shown) may communicate with an MTC UE 105 via the internet 130, by for example, sending a trigger message to one or more network elements of the CN 120 and/or receiving a small data payload via one or more network elements of the CN 120.

Although FIG. 1 shows two base stations (for example, eNBs 110) and two mobile devices (for example, UEs 105), it should be noted that in various example embodiments, BWA network 100 may include many more eNBs serving many more UEs than those shown in FIG. 1. Additionally, it should be noted that additional eNBs may be included in one RAN. It should also be noted that BWA network 100 may include many more network devices as defined by the LTE standard and/or any other like wireless communications standard. However, it is not necessary that all of these generally conventional components be shown in order to understand the example embodiments as described herein.

Figure 2:
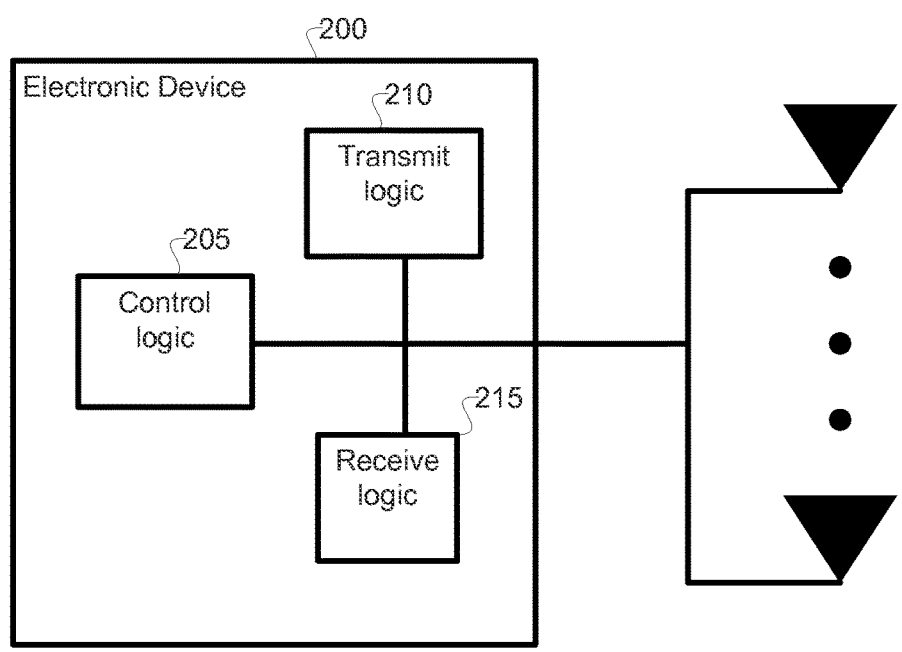
FIG. 2 illustrates the components of electronic device circuitry, such as user equipment (UE) circuitry and/or evolved Node B (eNB) circuitry, in accordance with various example embodiments.

FIG. 2 illustrates the components of electronic device circuitry 200 that may be eNB circuitry, UE circuitry, or some other type of circuitry in accordance with various embodiments. In embodiments, the electronic device circuitry may be, or may be incorporated into or otherwise a part of, a UE 105, an eNB 110, or some other type of electronic device. As shown, the electronic device circuitry 200 includes control circuitry 205, transmit circuitry 210, and receive circuitry 215.

According to various embodiments, the transmit circuitry 210 and the receive circuitry 215 may be coupled with one or more antennas to facilitate over-the-air transmissions with, for example, the eNB 110. For example, the transmit circuitry 210 may be configured to receive digital data from one or more components of eNB 110, and convert the received digital data into an analog signal for transmission over an air interface by way of the one or more antennas. The receive circuitry 215 may be any type of hardware device that can receive and convert a signal from a modulated radio wave into usable information, such as digital data. Receive circuitry 215 may be coupled with the one or more antennas in order to capture the radio waves. Receive circuitry 215 may be configured to send digital data converted from a captured radio wave to one or more other components of the UE 105. It should be noted that the transmit circuitry 210 and the receive circuitry 215 may be collectively referred to as "signal circuitry", "signaling circuitry", and the like. In embodiments, the transmit circuitry 210 and the receive circuitry 215 may be coupled to the control circuitry 205. The control circuitry 205 may be configured to perform control operations described herein with respect to the UE 105 and/or the eNB 110. The components of the UE 105 circuitry may be configured to perform operations similar to those described elsewhere in the present disclosure with respect to a UE 105. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules in combination with one or more hardware devices.

Figure 3:
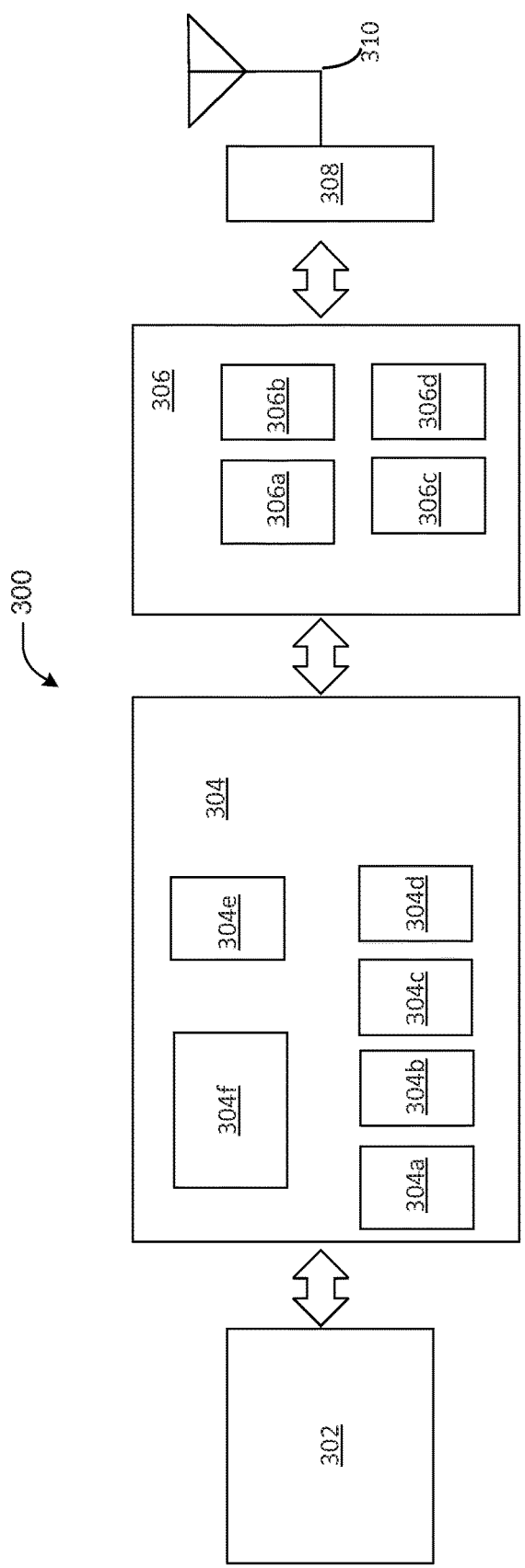
FIG. 3 illustrates example components of a UE device, in accordance with various example embodiments.

FIG. 3 illustrates, for one embodiment, example components of a user equipment (UE) device 300. In various embodiments, the UE device 300 may be the same or similar to UE 105 as described previously with regard to FIGS. 1-2. In some embodiments, the UE device 300 may include application circuitry 302, baseband circuitry 304, Radio Frequency (RF) circuitry 106, front-end module (FEM) circuitry 108 and one or more antennas 310, coupled together at least as shown.

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 304 may include circuitry such as, but not limited to, one or more single-core or multi-core processors. The baseband circuitry 304 may include one or more baseband processors and/or control logic to process baseband signals received from a receive signal path of the RF circuitry 306 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a second generation (2G) baseband processor 304*a*, third generation (3G) baseband processor 304*b*, fourth generation (4G) baseband processor 304*c*, and/or other baseband processor(s) 304*d* for other existing generations, generations in development or to be developed in the future (e.g., fifth generation (5G), 6G, etc.). The baseband circuitry 304 (e.g., one or more of baseband processors 304*a-d*) may handle various radio control functions that enable communication with one or more radio networks via the RF circuitry 306. The radio control functions may include, but are not limited to, signal modulation/demodulation, encoding/decoding, radio frequency shifting, and the like. In some embodiments, modulation/demodulation circuitry of the baseband circuitry 304 may include Fast-Fourier Transform (FFT), precoding, and/or constellation mapping/demapping functionality. In some embodiments, encoding/decoding circuitry of the baseband circuitry 304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 304*e* of the baseband circuitry 304 may be configured to run elements of the protocol stack for signaling of the PHY, MAC, RLC, PDCP and/or RRC layers. In some embodiments, the baseband circuitry may include one or more audio digital signal processor(s) (DSP) 304*f*. The audio DSP(s) 304*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an EUTRAN and/or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306*a*, amplifier circuitry 306*b* and filter circuitry 306*c*. The transmit signal path of the RF circuitry 306 may include filter circuitry 306*c* and mixer circuitry 306*a*. RF circuitry 306 may also include synthesizer circuitry 306*d* for synthesizing a frequency for use by the mixer circuitry 306*a* of the receive signal path and the transmit signal path. In some embodiments, the mixer circuitry 306*a* of the receive signal path may be configured to down-convert RF signals received from the FEM circuitry 308 based on the synthesized frequency provided by synthesizer circuitry 306*d*. The amplifier circuitry 306*b* may be configured to amplify the down-converted signals and the filter circuitry 306*c* may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306*a* of the receive signal path may comprise passive mixers, although the scope of the embodiments is not limited in this respect.

In some embodiments, the mixer circuitry 306*a* of the transmit signal path may be configured to up-convert input baseband signals based on the synthesized frequency provided by the synthesizer circuitry 306*d* to generate RF output signals for the FEM circuitry 308. The baseband signals may be provided by the baseband circuitry 304 and may be filtered by filter circuitry 306*c*. The filter circuitry 306*c* may include a low-pass filter (LPF), although the scope of the embodiments is not limited in this respect.

In some embodiments, the mixer circuitry 306*a* of the receive signal path and the mixer circuitry 306*a* of the transmit signal path may include two or more mixers and may be arranged for quadrature downconversion and/or upconversion respectively. In some embodiments, the mixer circuitry 306*a* of the receive signal path and the mixer circuitry 306*a* of the transmit signal path may include two or more mixers and may be arranged for image rejection (e.g., Hartley image rejection). In some embodiments, the mixer circuitry 306*a* of the receive signal path and the mixer circuitry 306*a* may be arranged for direct downconversion and/or direct upconversion, respectively. In some embodiments, the mixer circuitry 306*a* of the receive signal path and the mixer circuitry 306*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider. The synthesizer circuitry 306d may be configured to synthesize an output frequency for use by the mixer circuitry 306a of the RF circuitry 306 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. In some embodiments, the FEM circuitry 308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310.

In some embodiments, the UE device 300 may include additional elements such as, for example, memory/storage, display, camera, sensor, and/or input/output (I/O) interface (not shown).

Figure 4:
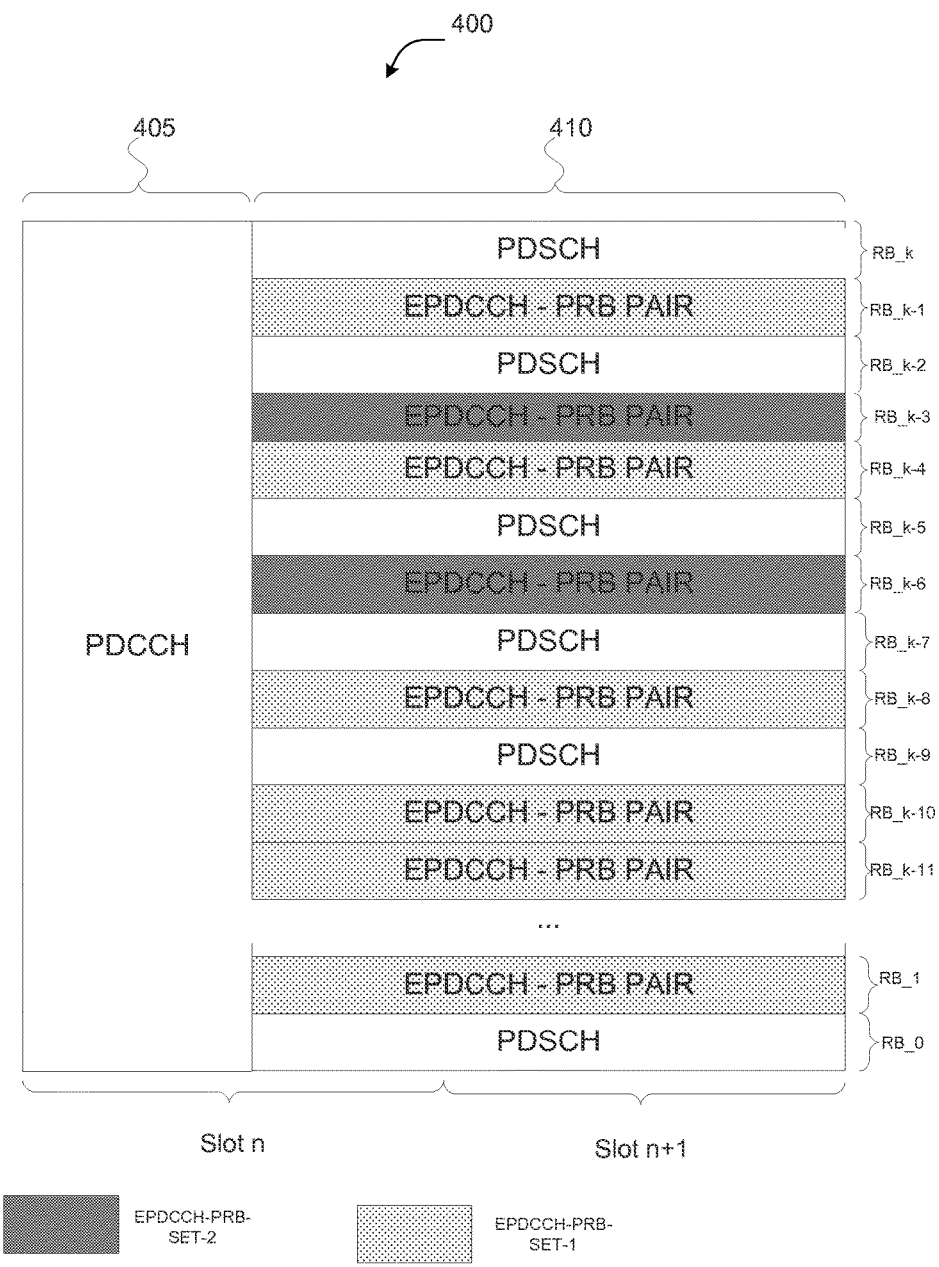
FIG. 4 illustrates an example allocation of enhanced physical downlink control channel (EPDCCH)-physical resource block (PRB)-sets in a subframe.

FIG. 4 illustrates an example allocation of EPDCCH-PRB-sets in a subframe 400, in accordance with various example embodiments. The subframe 400 may be within a radio frame that is 10 millisecond (ms) long having ten subframes of 1 ms each, wherein subframe 400 is one of the ten subframes, An OFDMA sub-carrier spacing for the radio frame in the frequency domain may be 15 kilohertz (kHz). Twelve of these sub-carriers together allocated during a 0.5 ms timeslot (for example, slot n and slot n+1 as shown in FIG. 4) are called a resource block (for example, resource block (RB)_0 to RB_k as shown in FIG. 4). A UE 105 may be allocated, in the downlink or uplink, a minimum of two resources blocks during one subframe. According to existing standards, the PDSCH may be used for user data transmissions and the PDCCH may be used for control information, such as downlink (DL) scheduling information and/or uplink (UL) scheduling information. The control information may specify the format of the data and the location and timing of the radio resources allocated to the UE 105. The DL control information may be in the form of a Downlink Control Information (DCI) message. The DCI message may be identified by a radio network temporary identifier (RNTI) encoded in the DCI message.

In many instances, the UE 105 is neither informed about its intended DCI format nor its location within the control region of the subframe 400. Therefore, the UE 105 may perform a number of decoding attempts to obtain the intended control format. This process is referred to as "blind decoding." The LTE standard also defines two search spaces, a UE-specific SS and a non-UE-specific SS (also referred to as a "common search space", "common-SS", etc.). The UE-specific SS may be used for transmission of control information that configures a UE 105 and includes PDCCH candidate locations that are monitored by the UE 105.

The control information carried by the UE-specific SS may include DCI messages for the UE 105 using a C-RNTI assigned to the specific UE 105, semi-persistent scheduling (SPS C-RNTI), or initial allocation (for example, a temporary C-RNTI). The UE 105 may monitor the UE-specific SS at aggregation levels (ALs) 1, 2, 4, and 8, where the AL is a number of control channel elements (CCEs) in the PDCCH.

The non-UE-specific SS may be used for transmission of common control information for all UEs 105 being serviced by an eNB 110 wherein the candidate locations are monitored by all or a group of UEs in the serving cell. The control information carried by the non-UE-specific SS may include DCI messages that are common for all or a group UEs 105 within the serving cell, such as system information RNTI (SI-RNTI), paging RNTI (P-RNTI), PRACH responses (RA-RNTI), and/or transmit power control (TPC) commands such as TPC-physical uplink shared channel (PUSCH)-RNTI and/or TPC-physical uplink control channel (PUCCH)-RNTI. The UEs 105 may monitor the non-UE-specific SS using aggregation levels 4 and 8. According to current LTE standards, a UE 105 may be required to monitor both the UE-specific SS and the non-UE-specific SS.

As show in FIG. 4, the subframe 400 also includes EPDCCH in the data region 410. In Release 11 of the 3GPP LTE specifications, the EPDCCH was defined to include PRB pairs that are reserved to contain EPDCCH transmissions (also referred to as "EPDCCH messages"). The EPDCCH messages may contain control information that is specific to a UE 105, such as a DCI message.

An EPDCCH message may include a set of one or more enhanced control channel elements (ECCEs), where a number of ECCEs within the EPDCCH is also referred to as an AL. Each ECCE may be mapped to a set of enhanced resource element groups (EREGs). One ECCE typically has four EREGs, but in some embodiments, an ECCE may include eight EREGs. Each EREG may be a group of Resource Elements (REs) in a physical resource block (PRB) pair. One EREG may include nine REs, and there may be sixteen EREGs per PRB pair. A PRB pair may be two continuous PRBs using a same subcarrier in the subframe 400. The EPDCCH may use the REs in an entire PRB or a PRB pair.

Unlike the PDCCH, which is mapped to a control region 405 of the subframe 400, the EPDCCH may be mapped to a data region 410 of the subframe 400. Each EPDCCH may be UE-specific such that that each UE 105 may have its own EPDCCH configuration. For each serving cell, higher layer signalling may configure a UE 105 with one or two EPDCCH-PRB sets for the UE 105 to monitor (also referred to as "EPDCCH monitoring"). Because EPDCCH is UE specific, in existing systems, a UE-specific SS is used for the EPDCCHs.

An EPDCCH configuration (also referred to herein as a "control channel configuration") may indicate one or more PRB pairs that the UE 105 is to monitor for its own control information transmissions. The PRB-pairs that a UE 105 is to monitor may be referred to as an "EPDCCH-PRB set." Typically, each EPDCCH-PRB set can have two, four, or eight PRB pairs. According to various example embodiments, an EPDCCH-PRB set may include six PRB pairs. For example, as shown in FIG. 4, there are six PRB pairs in the EPDCCH-PRB set-1 and two PRB pairs in EPDCCH-PRB set-2. According to other embodiments, the UE 105 may monitor a single EPDCCH-PRB set having six PRB pairs, or monitor two EPDCCH-PRB sets having a total of six PRB pairs that may be contiguous in frequency.

According to existing specifications, each UE 105 can be configured to monitor two EPDCCH-PRB sets, for example EPDCCH-PRB set-1 and EPDCCH-PRB set-2. The UE-specific SS for the EPDCCH may include a set of candidate ECCEs, and the UE 105 may perform blind decoding on the set of candidate ECCEs to ascertain whether any of the candidate ECCEs includes DCI messages.

In order to reduce power consumption based at least on the number of blind decoding attempts made by a UE 105, the UE 105 may monitor the EPDCCH according to one or more of the following example embodiments, monitoring at least one EPDCCH-PRB set for MTC UEs with reduced bandwidth support, associating multiple EPDCCH-PRB sets to different subframes, configuring a non-UE-specific SS for scheduling of an initial UE-specific SS control channel configuration, using a search space equation for the non-UE-specific SS, providing enhancements to channel estimation for EPDCCH and PDSCH, and/or providing enhancements support transmission of EPDCCH occupying six (6) PRB-pairs. Each of the aforementioned example embodiments will be described in detail below.

As noted previously, one example embodiment may include monitoring EPDCCH-PRB sets for MTC UEs with reduced bandwidth support. According to various example embodiments, an MTC UE 105 may monitor one or more EPDCCH-PRB sets specified by an EPDCCH configuration. Because an MTC UE 105 may have a maximum bandwidth support of 1.4 MHz, the MTC UE 105 may only be able to monitor a single contiguous block of six PRBs. Additionally, it may not be feasible to configure the MTC UE 105 to monitor multiple EPDCCH-PRB sets in a subframe if both EPDCCH sets are expanded to include six PRBs, which is provided by the example embodiments. Accordingly, in various embodiments, to reduce a number of blind decoding attempts, the MTC UE 105 may be configured to monitor no more than a single EPDCCH-PRB set in a subframe, which may be for the purpose of detecting multiple EPDCCH candidates in both normal coverage mode and enhanced coverage mode. For example, referring to FIG. 4, an MTC UE 105 may be configured to monitor only the EPDCCH-PRB set-1 in subframe 400 in both a normal coverage mode and an enhanced coverage mode.

In various other embodiments, an MTC UE 105 may be configured to monitor no more than a single EPDCCH-PRB set in a subframe only when the MTC UE 105 is operating in an enhanced coverage mode. For example, referring to FIG. 4, an MTC UE 105 may be configured to monitor only the EPDCCH-PRB set-1 in subframe 400 when the MTC UE 105 is in an enhanced coverage mode, and when the MTC UE 105 is in the normal mode, the MTC UE 105 may be configured to monitor both the EPDCCH-PRB set-1 and the EPDCCH-PRB set-2 in subframe 400, assuming that PRBs RB_through RB_k are limited to a contiguous bandwidth of six PRBs in consideration of the reduced bandwidth capability of the MTC UE 105.

According to other embodiments, a number of EPDCCH-PRB sets that can be configured to a MTC UE 105 may be limited at least when the MTC UE 105 is in the enhanced coverage mode. It should be noted that MTC UEs 105 may operate in enhanced coverage mode when the MTC UEs 105 are deployed in poor cellular service coverage areas, such as indoors, underground, in rural areas, and the like.

According to some other embodiments, the UE 105 may monitor both an EPDCCH-PRB set that is four PRBs in length and another EPDCCH-PRB set that is two PRBs in length, both of which may be within a same narrowband. In such embodiments, the UE 105 may determine an EPDCCH candidate transmitted with an AL of 24. In embodiments where two EPDCCH-PRB sets are monitored to obtain an EPDCCH candidate transmitted with an AL of 24, there may be only one EPDCCH candidate to be determined. In such embodiments, even if two EPDCCH-PRB sets are monitored, the UE 105 may monitor the two EPDCCH-PRB sets to detect a single candidate. By contrast, the UE 105 may be expected to monitor a single EPDCCH-PRB set for detecting multiple EPDCCH candidates.

As noted previously, one example embodiment may include associating multiple EPDCCH-PRB sets to different subframes. According to existing LTE specifications, a UE 105 may be configured to monitor up to two EPDCCH-PRB sets. However, MTC UEs 105 with reduced bandwidth support may only need to monitor for EPDCCH transmissions in one of the two EPDCCH-PRB sets in one or more subframes. According to various embodiments, if multiple EPDCCH-PRB sets are configured for a UE-specific SS, an MTC UE 105 may be configured to monitor one of the two EPDCCH-PRB sets in each subframe. In such embodiments, an association of EPDCCH-PRB sets to each set of non-overlapping subframes may be based on a hashing function that is at least a function of a C-RNTI of the MTC UE 105. This may provide some flexibility at the network side to reduce a blocking probability for EPDCCH transmissions to a large number of MTC UEs 105 by allowing different sets of MTC UEs 105 to monitor different narrowbands within a wider system bandwidth.

In order to allow different sets of MTC UEs 105 to monitor different narrowbands within the wider system bandwidth, the EPDCCH-PRB sets may be mapped to different narrowbands. In most embodiments these narrowbands may be non-overlapping, while in some embodiments the narrowbands may overlap depending on available network resources. In some embodiments, a predefined and/or preconfigured one-to-one mapping between the each EPDCCH-PRB set to non-overlapping subframes may be provided to the MTC UE 105.

According to various other embodiments, when a non-UE-specific SS is defined for a MTC UE 105, then the two EPDCCH-PRB sets may be configured such that a first EPDCCH-PRB set of the two EPDCCH-PRB sets corresponds to the UE-search specific SS for the MTC UE 105 and a second EPDCCH-PRB set of the two EPDCCH-PRB sets corresponds to EPDCCH non-UE-specific SS. In various embodiments, the MTC UE 105 may be configured to monitor only the first EPDCCH-PRB set or the second EPDCCH-PRB set in a single subframe. In some embodiments, the MTC UE 105 may be configured to monitor only the first EPDCCH-PRB set or the second EPDCCH-PRB set only when the MTC UE 105 is operating in the enhanced coverage mode.

Further, the association of EPDCCH-PRB sets to subframes may be defined based on a granularity of X subframes, where $X \geq 1$ and includes a retuning time needed for the MTC UE 105 to switch from one narrowband (for example, a narrowband spanning 1.4 MHz) to another narrowband within a larger system bandwidth.

It should be noted that assigning a non-UE-specific SS and a UE-specific SS to different EPDCCH-PRB sets may be in addition to or independent of the control channel configuration of the non-UE-specific SS that is used to schedule a radio resource control (RRC) configuration for the UE-specific SS. In general, the control channel configuration for the non-UE-specific SS for an initial EPDCCH RRC configuration and the non-UE-specific SS for other purposes may be different. These other purposes for the non-UE-specific SS may include DCI transmissions for group power control using TPC-PUSCH-RNTI and/or TPC-PUCCH-RNTI, notification of multicast control channel (MCCH) changes at least to MTC UEs 105 in an RRC_CONNECTED mode using multimedia broadcast multicast service (MBMS)-RNTI, paging RNTI (P-RNTI), Random Access RNTI (RA-RNTI), and the like. The control channel configuration for the non-UE-specific SS may be indicated together with the UE-specific SS by association to different EPDCCH-PRB sets.

As noted previously, one example embodiment may include configuring non-UE-specific search space for scheduling of the initial UE-specific search space configuration. In current LTE specifications, an EPDCCH UE-specific SS configuration may be provided to a UE 105 via RRC signaling which may be scheduled using PDCCH transmissions in the non-UE-specific SS. However, due to the reduced bandwidth support of 1.4 MHz, MTC UEs 105 may not receive the legacy PDCCH transmissions because such PDCCH transmissions may be outside of the reduced transmission bandwidth of 1.4 MHz. According to various embodiments, a non-UE-specific SS for EPDCCH transmissions can be defined for the MTC UEs 105. In such embodiments, a control channel configuration indicating the non-UE-specific SS for EPDCCH transmissions may be provided to the MTC UEs 105 via a master information block (MIB) or one or more system information blocks (SIBs) specified for MTC UEs 105 (referred to herein as "MTC SIBs").

It should be noted that the non-UE-specific SS for EPDCCH transmissions may be used to schedule an initial UE-specific SS configuration and may also be used to indicate another common SS. For instance, such a common SS may be defined by mapping different EPDCCH-PRB sets to sets of non-overlapping subframes. A consideration regarding the design of the non-UE-specific SS for EPDCCH concerns the subframes in which a UE 105 is expected to monitor for EPDCCH transmissions in the EPDCCH non-UE-specific SS.

In various embodiments, as part of the random access procedure, a UE 105 may be expected to monitor the non-UE-specific SS for EPDCCH transmissions in subframes before a contention resolution timer (CRTimer) expires. The narrowband frequency that the UE 105 is to monitor for the non-UE-specific SS may be based on a configuration provided via an MTC SIB.

In various embodiments, the EPDCCH transmissions in the non-UE-specific SS may include a contention resolution (CR) message (also known as "Message 4" as part of the random access procedure), and a 16-bit cyclic redundancy check (CRC) of the CR message may be scrambled with a temporary C-RNTI that was provided to the UE 105 in a random access response message. Additionally, in various embodiments the configuration for the UE-specific SS for subsequent EPDCCH transmissions may be signaled as part of the CR message.

According to current specifications, a SIB2 message may carry common channel information and/or shared channel information. Additionally, current specifications provide that the CRTimer can take on one of the following values as indicated in the SIB2 message as part of a random access channel (RACH) configuration: {8, 16, 24, 32, 40, 48, 56, 64}. The value of the CRTimer may indicate a number of subframes to be monitored and/or a number of EPDCCH transmission repetitions. Because MTC UEs 105 may require the use of transmission repetitions for EPDCCH transmissions in a non-UE-specific SS, according to various embodiments, the CRTimer value range may be extended to include values greater than 64 subframes. Additionally, the value of the CRTimer may be provided to the MTC UE 105 using an MTC SIB or the MTC UE 105 may be preconfigured with the CRTimer value. In various embodiments, the CRTimer value indicated in the MTC SIB or predefined for MTC UEs 105 may be different for MTC UEs 105 with different coverage enhancement targets. In such embodiments, the CRTimer value can be a function of an amount of coverage enhancement needed and/or a desired repetition amount to satisfy a desired coverage enhancement.

Additionally, in some embodiments, an initial configuration of the EPDCCH UE-specific SS may be limited to a few procedures in order to reduce blind decoding attempts and/or reduce signaling. For example, in various embodiments, only DCI format 1 A messages or a compact version of DCI format 1 A messages for an MTC UE 105 may be carried by the EPDCCH in the non-UE-specific SS.

Furthermore, since channel state information reference signal (CSI-RS) configuration may not be known by an MTC UE 105 at this stage of the random access procedure (for example, during an initial access), some embodiments include puncturing the REs used for transmission of the CSI-RS from an eNB 110 for the EPDCCH transmission in the non-UE-specific SS in order to schedule the CR message. Other embodiments includes rate-matching the EPDCCH transmission around one or more possible CSI-RS configurations. Methods for bit puncturing and rate-matching are well known and will not be discussed herein in detail.

Moreover, the typical distributed EPDCCH design defined by current standards may be reused for the physical transmission scheme for transmitting the EPDCCH transmissions in the non-UE-specific SS. For example, the currently defined distributed EPDCCH design that employs implementation-based pseudo-random beamforming with RE-based precoder cycling or diversity-based SFBC may be used for EPDCCH transmissions in the non-UE-specific SS.

As noted previously, one example embodiment may include using a search space equation for non-UE-specific search space. According to various embodiments, a search space equation may be used to define both the non-UE-specific SS that is used to schedule RRC messages that carry the control channel configuration of the UE-specific SS and any other non-UE-specific SS that may be configured as part of the EPDCCH-PRB-sets of the previously described embodiments. For example, the search space equations may be used for DCI transmissions scrambled with TPC-PUSCH-RNTI, TPC-PUCCH-RNTI, MBMS-RNTI, etc., or configured via one or more MTC SIBs and used for DCI transmissions scrambled with SI-RNTI, RA-RNTI, P-RNTI.

The current standards specify the following search space equation for EPDCCH UE-specific SS.

An EPDCCH UE-specific SS $ES_k^{(L)}$ at aggregation level $L=\in\{1,2,3,8,16,32\}$ is defined by a set of EPDCCH candidates.

For an EPDCCH-PRB set p, the ECCEs corresponding to EPDCCH candidate m of the search space $ES_k^{(L)}$ are given by equation 1:

$$L\left\{\left(Y_{p,k} + \left\lfloor \frac{m \cdot N_{ECCE,p,k}}{L \cdot M_p^{(L)}} \right\rfloor + b\right) \bmod \left\lfloor \frac{N_{ECCE,p,k}}{L} \right\rfloor\right\} + i \quad \text{[Equation 1]}$$

In equation 1, $Y_{p,k}$ is defined by 3GPP technical specification (TS) 36.213 version 12.5.0 (2015-03 (herein after referred to as "TS 36.213"), i=0, . . . , L−1, and b=$n_{CI}$ if the UE 105 is configured with a carrier indicator field for a serving cell on which an EPDCCH is monitored, otherwise b=0,; $n_{CI}$ is the carrier indicator field value, m=0,1, . . . , $M_p^{(L)}$−1, . If the UE 105 is not configured with a carrier indicator field for the serving cell on which EPDCCH is monitored, $M_p^{(L)}$ is the number of EPDCCH candidates to monitor at aggregation level L in EPDCCH-PRB set p for the serving cell on which EPDCCH is monitored, as given in Tables 9.1.4-1a, 9.1.4-1b, 9.1.4-2a, 9.1.4-2b, 9.1.4-3a, 9.1.4-3b, 9.1.4-4a, 9.4.4-4b, 9.1.4-5a, 9.1.4-5b of TS 36.213; otherwise, $M_p^{(L)}$ is the number of EPDCCH candidates to monitor at aggregation level L in EPDCCH-PRB set p for the serving cell indicated by $n_{CI}$.

A UE is not expected to monitor an EPDCCH candidate, if an ECCE corresponding to that EPDCCH candidate is mapped to a PRB pair that overlaps in frequency with a transmission of either PBCH or primary or secondary synchronization signals in the same subframe.

If a UE is configured with two EPDCCH-PRB sets with the same $n_{ID,i}^{EPDCCH}$ value (where $n_{ID,i}^{EPDCCH}$ is defined by TS 36.213), if the UE receives an EPDCCH candidate with a given DCI payload size corresponding to one of the EPDCCH-PRB sets and mapped only to a given set of REs, and if the UE is also configured to monitor an EPDCCH candidate with the same DCI payload size and corresponding to the other EPDCCH-PRB set and which is mapped only to the same set of REs, and if the number of the first ECCE of the received EPDCCH candidate is used for determining PUCCH resource for HARQ-acknowledgement (ACK), the number of the first ECCE shall be determined based on EPDCCH-PRB set p=0.

The variable $Y_{p,k}$ is defined by equation 2:

$$Y_{p,k} = (A_p \cdot Y_{p,k-1}) \bmod D \quad \text{[Equation 2]}$$

In equation 2, $Y_{p,-1} = n_{RNTI} \neq 0$, $A_0 = 39827$, $A_1 = 39829$, D=65537, and $$k = \left\lfloor \frac{n_s}{2} \right\rfloor,$$

where $n_S$ is the slot number within a radio frame. The RNTI value used for $n_{RNTI}$ is defined in by TS 36.213 for both downlink and uplink. The DCI formats that the UE shall monitor depend on the configured transmission mode per each serving cell as defined in the TS 36.213.

According to various embodiments, a design of the non-UE-specific SS for EPDCCH can be based on the search space equation for EPDCCH UE-specific SS as described above. Additionally, as for EPDCCH UE-specific SS, a UE 105 may not be expected to monitor for EPDCCH candidates in the non-UE-specific SS if an ECCE corresponding to that EPDCCH candidate is mapped to a PRB pair that overlaps in frequency with a transmission of either PBCH or PBCH repetition blocks (in case of PBCH repetitions for enhanced coverage) or primary or secondary synchronization signals in the same subframe.

According to various embodiments, the EPDCCH UE-specific SS search space equation may be re-used from to determine the ECCEs corresponding to EPDCCH candidate m of the non-UE-specific search space $ES_k^{(L)}$ where $Y_{p,k}$=0, b=0 and p=0 where p =0 implies that only a single EPDCCH-PRB-set is configured for the EPDCCH non-UE-specific SS.

Further, according to various embodiments, only ALs of 16 and 24 or ALs of 8 and 16may be supported for non-UE-specific EPDCCH search space for MTC UEs 105. The choice between using ALs 16 and 24 or ALs 8 and 16 can be indicated via one or more MTC SIBs or may be specified depending on whether the cell supports enhanced coverage operations. Such an indication may be conveyed using a spare bit of the existing MIB. In various embodiments, ALs 16 and 24 may be supported for the non-UE-specific search space if the cell supports enhanced coverage operation and ALs 8 and 16 may be supported if the cell does not support enhanced coverage. In some embodiments, only AL 24 may be supported for non-UE-specific SS if the cell supports enhanced coverage.

As noted previously, one example embodiment may include providing enhancements to channel estimation for EPDCCH and PDSCH. For enhanced coverage operation it is known that channel estimation performance is often a bottle-neck for overall performance in relatively low (or very low) signal-to-noise (SNR) regimes. Currently, a choice of precoding used for EPDCCH can be changed in a UE-transparent manner by a transmitting eNB 110. To provide better channel estimation at the UE 105, in various embodiments, PRB bundling may be used for EPDCCH in the UE-specific SS or the non-UE-specific SS such that the UE 105 may assume that the precoding used for EPDCCH in a subframe is not changed across N contiguous PRBs where 2≤N≤8. It should be noted that PRB bundling may be referred to as "precoding granularity." Therefore, in various embodiments, the UE may assume that the precoding granularity in the frequency dimension is N PRBs irrespective of whether a precoding matrix indicator (PMI) and/or a rank indicator (RI) (also referred to as "PMI/RI") is configured or not. Such embodiments can be applied to UEs 105 operating in an enhanced coverage mode.

For MTC UEs 105 with reduced BW support, the precoding granularity in the frequency dimension may be N PRBs where 2≤N≤6 irrespective of whether a PMI/RI is configured or not. Note that for distributed EPDCCH transmissions, a precoder cycling over a same two precoders can be assumed by the UE 105 within different PRBs of a PRB bundle. In various embodiments, the UE 105 may assume that the same precoders for antenna ports (AP) 107 and AP 109 for all PRBs are used within a PRB bundle for distributed EPDCCH transmissions.

As per current specifications, PRB bundling is supported for DM-RS based transmission modes, such as TM 9 and/or TM 10, where a size of a PRB bundle depends on the system bandwidth as shown in the table 1:

TABLE 1

| System Bandwidth ($N_{RB}^{DL}$) | PRG Size (P') (PRBs) |
| --- | --- |
| ≤10 | 1 |
| 11-26 | 2 |
| 27-63 | 3 |
| 64-110 | 2 |

In order to improve channel estimation performance for PDSCH reception when the UE 105 is in enhanced coverage, according to various embodiments, a PRB bundling operation can be enhanced for DM-RS based transmission modes such that a PRB group (PRG) size can equal the number of PRBs allocated for PDSCH transmission in a subframe. The PRG size may be the number of PRBs for which the UE 105 can assume that the precoding granularity is not changed. Such embodiments may be applied to both MTC UEs 105 and other UEs 105 in the enhanced coverage mode. For MTC UEs 105 with reduced bandwidth support, a maximum size of the PRG can be up to six PRBs according to most embodiments.

In the time domain, for repeated transmissions of EPDCCH and PDSCH transmissions based on DM-RS, in various embodiments, the UE 105 may assume that the precoding is not changed within M subframes in order to provide for cross-subframe channel estimation, where the value of M can be predefined or preconfigured by the eNB 110. Further, in some embodiments, the value of M can be a function of the repetition level used for EPDCCH or PDSCH transmissions.

As noted previously, one example embodiment may include providing enhancements support transmission of EPDCCH occupying six (6) PRB-pairs. According to various embodiments, for enhanced coverage, one PDCCH for MTC UEs 105 containing one DCI is allowed to be mapped to fully occupy available REs in six PRB pairs. Accordingly, for enhanced coverage operations, an EPDCCH-PRB set can be mapped to six PRBs in frequency. However, according to current specifications, an EPDCCH-PRB set can only span 2, 4, or 8 PRBs in frequency.

A consequence of the above is that a maximum AL that can be supported when an EPDCCH-PRB-set is six PRB-pairs is an AL of 24 for both localized and distributed EPDCCH transmissions. According to current standards for EPDCCH design, localized EPDCCH transmissions can have a maximum AL of 8. However, in order to reduce the number of repetitions required for enhanced coverage, similar to distributed EPDCCH transmissions, various embodiments provide for ALs 16 and 24 to be used for localized EPDCCH transmissions, such as localized EPDCCH transmissions belonging to Case 2 as defined by TS 36.213.

In order to reduce the number of blind decoding attempts needed with the increase in the number of ALs, the set of ALs that a UE 105 may be expected to monitor for an EPDCCH can be configured or predefined to correspond to a coverage enhancement level. The predefined ALs may be a subset of all possible ALs from 1 to 24, wherein the subset of ALs may be based on one or more design choices. For example, in some embodiments, a UE 105 may assume that only ALs 16 and 24 are used to transmit localized or distributed EPDCCH transmissions when the UE 105 is operating at a highest coverage enhancement level. In various embodiments, for non-UE-specific SS used to schedule RRC messages carrying the UE-specific SS EPDCCH configuration, the subset of ALs used can be indicated by the MTC SIB.

Additionally, as noted previously, each ECCE may be mapped to a set of EREGs. In various embodiments, a mapping equation used to map ECCE to EREGs of distributed EPDCCH transmissions may be modified to support an EPDCCH-PRB-set of six PRBs while being backwards compatible to currently valid control channel configurations.

The currently specified ECCE to EREG mapping equation is as follows:

Within EPDCCH set $X_m$ in subframe i, the ECCEs available for transmission of EPDCCHs are numbered from 0 to $N_{ECCE,m,i}-1$ and ECCE number n corresponds to EREGs numbered (n mod $N_{ECCE}^{RB}$)+$jN_{ECCE}^{RB}$ in PRB index [n/$N_{ECCE}^{RB}$] for localized mapping, and EREGs numbered [n/$N_{ECCE}^{RB}$]+$jN_{ECCE}^{RB}$ in PRB indices $$\left(n + j\max\left(1, \frac{N_{RB}^{X_m}}{N_{EREG}^{ECCE}}\right)\right) \mod N_{RB}^{X_m}$$

for distributed mapping, where j=0,1, . . . , $N_{EREG}^{ECCE}-1$, $N_{EREG}^{ECCE}$ is the number of EREGs per ECCE, and $N_{ECCE}^{RB}=16/N_{EREG}^{ECCE}$ is the number of ECCEs per resource-block pair. The physical resource-block pairs constituting EPDCCH set $X_m$ are assumed to be numbered in ascending order from 0 to $N_{RB}^{X_m}-1$.

According to various embodiments, the above equation may be modified to include a floor function in order to determine a six PRB-length EPDCCH PRB set to monitor. In such embodiments, the floor function may be introduced into the portion of the mapping equation used to derive the PRB indices. The modified ECCE to EREG mapping equation with the floor function (represented by "floor( )") is shown below.

Within EPDCCH set $X_m$ in subframe i, the ECCEs available for transmission of EPDCCHs are numbered from 0 to $N_{ECCE,m,i}-1$ and ECCE number n corresponds to EREGs numbered (n mod $N_{ECCE}^{RB}$)+$jN_{ECCE}^{RB}$ in PRB index [n/$N_{ECCE}^{RB}$] for localized mapping, and EREGs numbered [n/$N_{ECCE}^{RB}$]+$jN_{ECCE}^{RB}$ in PRB indices $$\left(n + j\max\left(1, \text{floor}\left(\frac{N_{RB}^{X_m}}{N_{EREG}^{ECCE}}\right)\right)\right) \bmod N_{RB}^{X_m}$$

for distributed mapping, where j=0,1, . . . , $N_{EREG}^{ECCE}-1$, $N_{EREG}^{ECCE}$ is the number of EREGs per ECCE, and $N_{ECCE}^{RB}=16/N_{EREG}^{ECCE}$ is the number of ECCEs per resource-block pair. The physical resource-block pairs constituting EPDCCH set $X_m$ are assumed to be numbered in ascending order from 0 to $N_{RB}^{X_m}-1$. In various embodiments, $$\text{floor}\left(\frac{N_{RB}^{X_m}}{N_{EREG}^{ECCE}}\right)$$

may be a largest number not greater than $$\frac{N_{RB}^{X_m}}{N_{EREG}^{ECCE}}.$$

Figure 5:
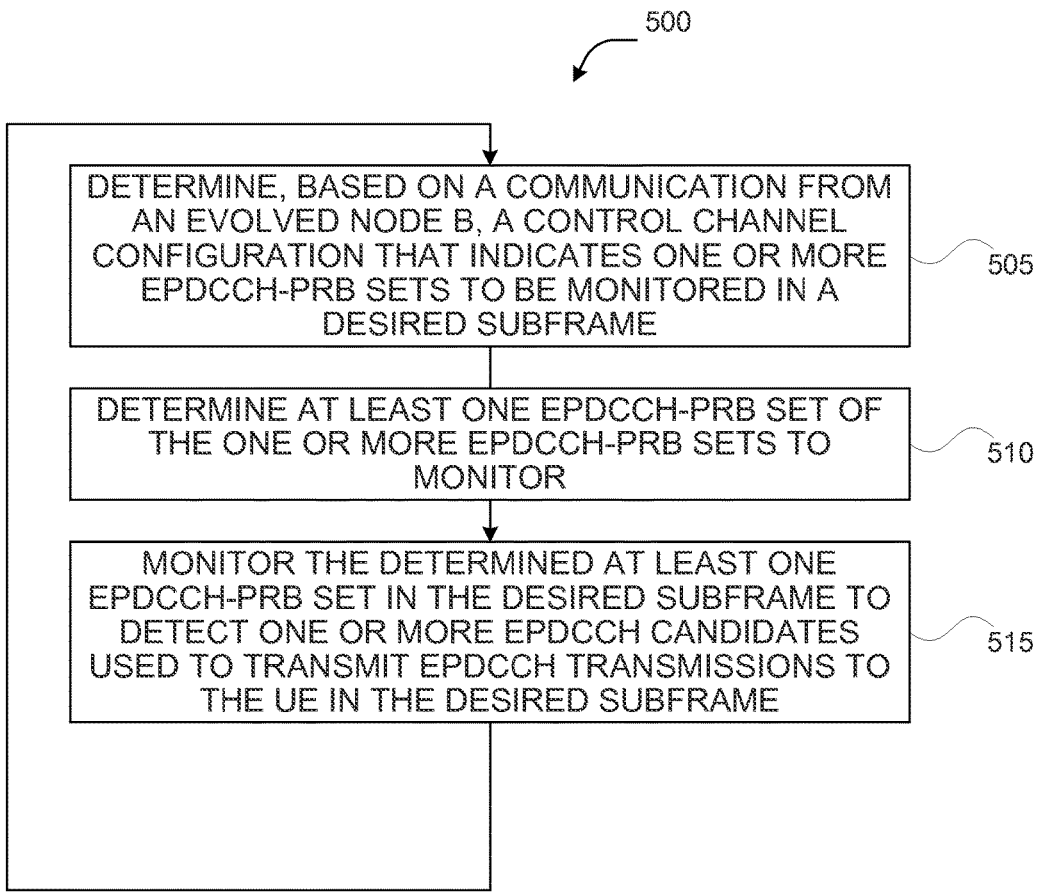
FIG. 5 illustrates a process for monitoring EPDCCH-PRB sets by a UE, in accordance with various embodiments.

FIG. 5 illustrates a process 500 that may be performed by a UE 105 to monitor an EPDCCH-PRB set in accordance with various embodiments. In some embodiments, the UE 105 may include one or more non-transitory computer-readable media having instructions, stored thereon, which when executed by the UE 105, cause the UE 105 to perform the process 500. For illustrative purposes, the operations of process 500 will be described as being performed by the UE 105, which is described with respect to FIGS. 1-3. However, it should be noted that other similar devices may operate the process 500. While particular examples and orders of operations are illustrated in FIG. 5, in various embodiments, these operations may be re-ordered, broken into additional operations, combined, and/or omitted altogether. In some embodiments, the operations illustrated in FIG. 5 may be combined with operations described with regard to other embodiments, such as those illustrated by any one of FIGS. 6-9.

Referring to FIG. 5, at operation 505 the UE 105 may determine, based on a communication from an eNB 110, a control channel configuration that indicates one or more EPDCCH-PRB sets to be monitored in one or more desired subframe(s). The control channel configuration may be provided to the UE 105 by the eNB 110 during an RRC signaling procedure. For example, the UE 105 may receive the control channel configuration for a non-UE-specific search space as part of RRC signaling used to configure the UE 105. In some embodiments, the control channel configuration may be provided to the UE 105 by the eNB 110 in an MIB or one or more SIBs dedicated to MTC UEs 105.

At operation 510, the UE 105 may determine at least one EPDCCH-PRB set of the one or more EPDCCH-PRB sets to monitor. In some embodiments, the control channel configuration may indicate one or more EPDCCH-PRB sets to monitor for EPDCCH transmissions across a plurality of subframes. In embodiments, an association of EPDCCH-PRB sets to subframes may be defined based on a granularity of X subframes, where the value of X is greater than or equal to 1. The value of X may also include a retuning time that is required for the UE 105 to switch from a first narrowband to a second narrowband, such as a retuning time needed to switch from a narrowband spanning 1.4 MHz to another narrowband within a larger system bandwidth.

In some embodiments, the control channel configuration may indicate a plurality of EPDCCH-PRB sets to be monitored in an EPDCCH UE-specific SS. In such embodiments, an association between the EPDCCH-PRB set to each set of non-overlapping subframes may be based on a hashing function that is at least a function of a C-RNTI associated with the UE 105.

In some embodiments, the control channel configuration may indicate at least two EPDCCH-PRB sets to be monitored by the UE 105, wherein at least one EPDCCH-PRB set corresponds to the EPDCCH UE-specific SS and at least one other EPDCCH-PRB set corresponds to a non-UE-specific SS. It should be noted that for MTC UEs 105, if both EPDCCH-PRB sets are monitored in the same subframe, then both EPDCCH-PRB sets should be mapped to PRBs that are limited to a contiguous 1.4 MHz bandwidth.

At operation 515, the UE 105 may monitor the determined at least one EPDCCH-PRB set in the desired subframe to detect one or more EPDCCH candidates used to transmit EPDCCH transmissions to the UE in the desired subframe. In embodiments where the control channel configuration indicates one or more EPDCCH-PRB sets to monitor for EPDCCH transmissions across a plurality of subframes, the UE 105 may be expected to monitor a selected EPDCCH-PRB set in the plurality of subframes. In embodiments where the control channel configuration indicates a plurality of EPDCCH-PRB sets to be monitored in an UE-specific SS, the UE 105 may monitor the UE-specific SS according to the association between the EPDCCH-PRB set to each set of non-overlapping subframes. In embodiments where the control channel configuration indicates at least one EPDCCH-PRB set corresponding to the UE-specific SS and at least one other EPDCCH-PRB set corresponding to the non-UE-specific SS, the UE 105 may monitor one or more subframes in the UE-specific SS according to the at least one EPDCCH-PRB set corresponding to the UE-specific SS, and the UE 105 may monitor one or more subframes in the non-UE-specific SS according to the at least one other EPDCCH-PRB set corresponding to the non-UE-specific SS.

Furthermore, in some embodiments, the UE 105 may monitor at least one EPDCCH-PRB set for the purpose of detecting multiple EPDCCH candidates in a desired subframe regardless of whether the UE 105 is in a normal coverage mode or an enhanced coverage mode, while in other embodiments the UE 105 may monitor at least one EPDCCH-PRB set in a desired subframe only when the UE is in the enhanced coverage mode. In embodiments where the control channel configuration indicates the at least one EPDCCH-PRB-set to be monitored across a plurality of subframes, the UE 105 may monitor the at least one EPDCCH-PRB set in each of a plurality of subframes defined by the control channel configuration. The UE 105 continues to monitor the determined EPDCCH-PRB set in the indicated subframes for the one or more EPDCCH transmissions until the UE 105 determines, based on another communication from an eNB 110, another control channel configuration (also referred to as a "reconfiguration," a "control channel reconfiguration," "a new physical downlink control channel configuration," and the like), which may be determined by the UE 105 in a same or similar manner as discussed with regard to operation 505.

Figure 6:
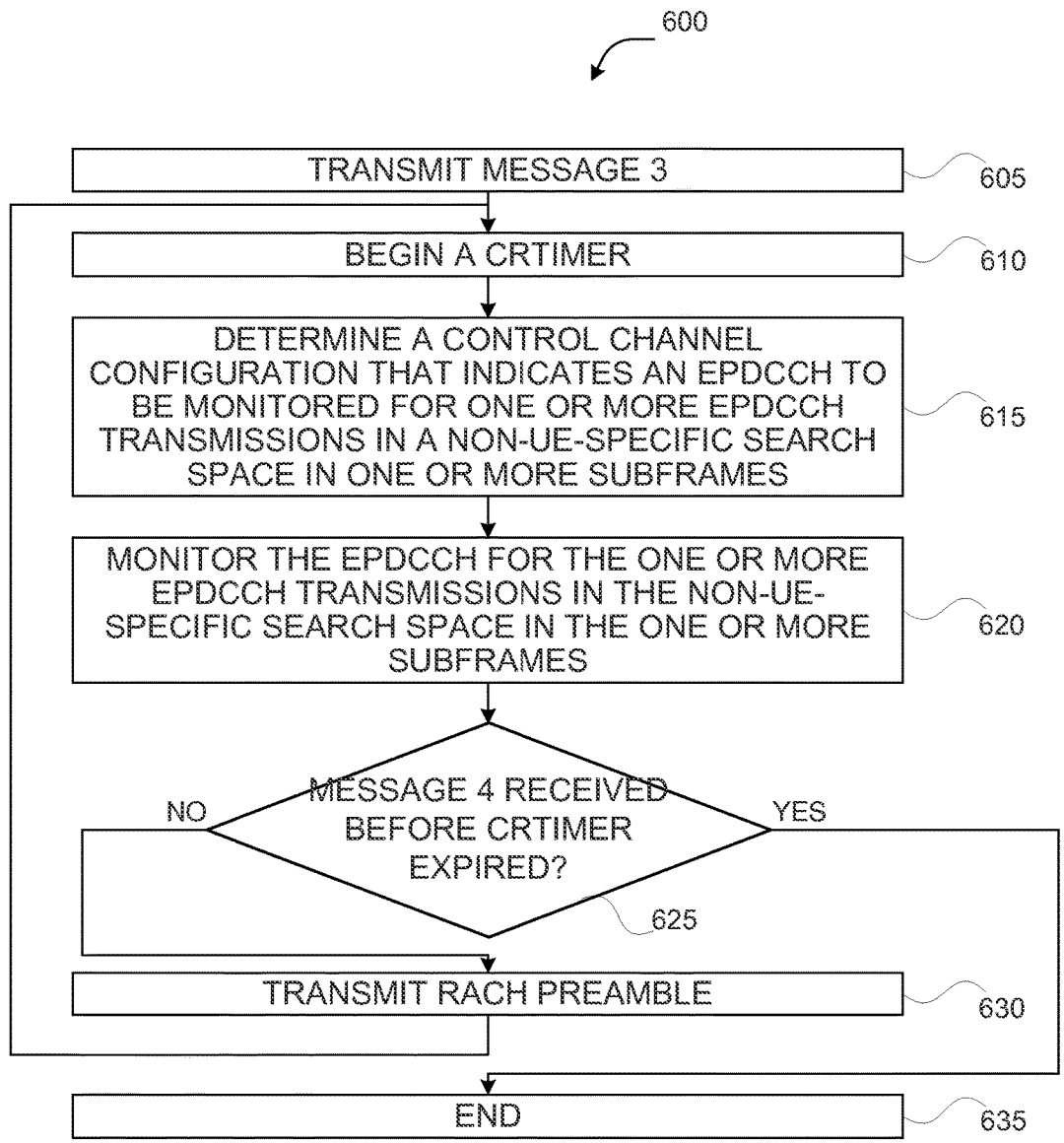
FIG. 6 illustrates another process for monitoring EPDCCH-PRB sets by a UE, in accordance with various embodiments.

FIG. 6 illustrates a process 600 that may be performed by a UE 105 to obtain an initial configuration for the UE-specific SS for EPDCCH as part of a RRC Connection establishment procedure, in accordance with various embodiments. In some embodiments, the UE 105 may include one or more non-transitory computer-readable media having instructions, stored thereon, which when executed by the UE 105, cause the UE 105 to perform the process 600. For illustrative purposes, the operations of process 600 will be described as being performed by the UE 105, which is described with respect to FIGS. 1-3. However, it should be noted that other similar devices may operate the process 600. While particular examples and orders of operations are illustrated in FIG. 6, in various embodiments, these operations may be re-ordered, broken into additional operations, combined, and/or omitted altogether. In some embodiments, the operations illustrated in FIG. 6 may be combined with operations described with regard to other embodiments, such as those illustrated by any one of FIGS. 5 and 7-9.

Referring to FIG. 6, at operation 605 the UE 105 may transmit an RRC connection request message (also referred to as a "Message 3"). The Message 3 may be transmitted according to current standards, such as those defined by 3GPP TS 25.331 version 12.6.0 (2015-06). For example, the Message 3 may be transmitted over the physical uplink shared channel (PUSCH) by the UE 105 when the UE 105 is in an idle mode when upper layers in the UE 105 request establishment of an RRC connection.

At operation 610, the UE 105 may begin or otherwise initiate a CRTimer. The CRTimer may take effect upon the transmission of the Message 3. In various embodiments, the CRTimer may be indicative of a number of subframes that the UE 105 is to monitor. In some embodiments, the CRTimer value may be specific to the UE 105 and/or may be a function of an amount of coverage enhancement required by the UE 105 when the UE 105 is in the enhanced coverage mode. In various embodiments, the value of the CRTimer may be larger than 64 subframes. In some embodiments, if the UE 105 receives an indication that the Message 3 was not received, such as a HARQ-non-acknowledgement (NACK), the Message 3 may be re-transmitted and the CRTimer may be restarted.

At operation 615, the UE 105 may determine a control channel configuration that indicates an EPDCCH to be monitored for one or more EPDCCH transmissions in a non-UE-specific SS in one or more subframes. In some embodiments, the control channel configuration may indicate a non-UE-specific search space for the UE 105 to monitor. The non-UE-specific search space for EPDCCH transmissions may be indicated at least in part via an MTC SIB and/or one or more spare bits of an MIB.

At operation 620, the UE 105 may monitor the EPDCCH for the one or more EPDCCH transmissions in the non-UE-specific SS in the one or more subframes. In various embodiments, the one or more EPDCCH transmissions intended for the UE 105 may carry a DCI message. In some embodiments, the DCI message may be a DCI format 1A message. In embodiments where the UE 105 is a MTC UE 105, the DCI message may be a compact version of the DCI format 1A. Additionally, in various embodiments, the DCI message may include a 16-bit CRC that is scrambled with a temporary C-RNTI that was provided to the UE 105 in a random access response message. In various embodiments, the UE 105 may monitor for the EPDCCH transmissions in the non-UE-specific SS for a CR message (also referred to as a "Message 4"). In such embodiments, the UE 105 may monitor the EPDCCH for the Message 4 without any knowledge of CSI-RS transmissions for the UE 105 in one or more subframes carrying the EPDCCCH transmissions. Furthermore, in various embodiments, the EPDCCH transmissions may be scheduled for transmission by the eNB 110 by puncturing EPDCCH transmissions corresponding to one or more REs used for transmission of the CSI-RS transmissions. In other embodiments, the EPDCCH transmissions may be scheduled for transmission by the eNB 110 by rate-matching one or more REs used for transmission of the CSI-RS transmissions. In some embodiments, the EPDCCH transmissions in the non-UE-specific SS may be transmitted using distributed EPDCCH employing implementation-based pseudo-random beamforming with RE-based precoder cycling or diversity-based space frequency block coding (SFBC).

At operation 625, the UE 105 may determine whether the Message 4 has been received from the eNB 110. The CRTimer initiated at operation 610 may terminate upon reception of the CR message. In various embodiments, the CSI-RS configuration may not be known by the UE 105 during the random access procedure. In such embodiments, the CR message may be scheduled for transmission without knowledge of any specific CSI-RS transmissions in a subframe or a plurality of subframes carrying the EPDCCH transmissions. In some embodiments, the CR message may be scheduled by puncturing the EPDCCH transmissions corresponding to the REs used for CSI-RS transmission in a particular subframe. Other embodiments may include rate-matching the EPDCCH transmissions around all possible CSI-RS configurations. If at operation 625 the UE 105 determines that the Message 4 was not received, then UE 105 may proceed back to operation 620 to continue monitoring the EPDCCH for the one or more EPDCCH transmissions in the non-UE-specific SS in the one or more subframes.

If at operation 625 the UE 105 determines that the Message 4 was received prior to the expiration of the CRTimer, then UE 105 may proceed to operation 635 to end the process 600. If the UE 105 does not receive the Message 4 before expiration of the CRTimer, then the UE 105 may proceed back to operation 630 to transmit a random access (RACH) preamble during a random access procedure. If the Message 4 is not received and the CRTimer has expired, then the UE 105 may assume that a collision occurred with another UE 105 and the UE 105 failed the contention resolution process. In most embodiments, the RACH preamble transmission may be initiated at the next occurrence of PRACH resources. In other embodiments, instead of transmitting a RACH preamble, the UE 105 may proceed back to operation 605 to retransmit another Message 3. Once the RACH preamble has been inatated, the UE 105 may proceed to operation 610 to begin another CRTimer.

Figure 7:
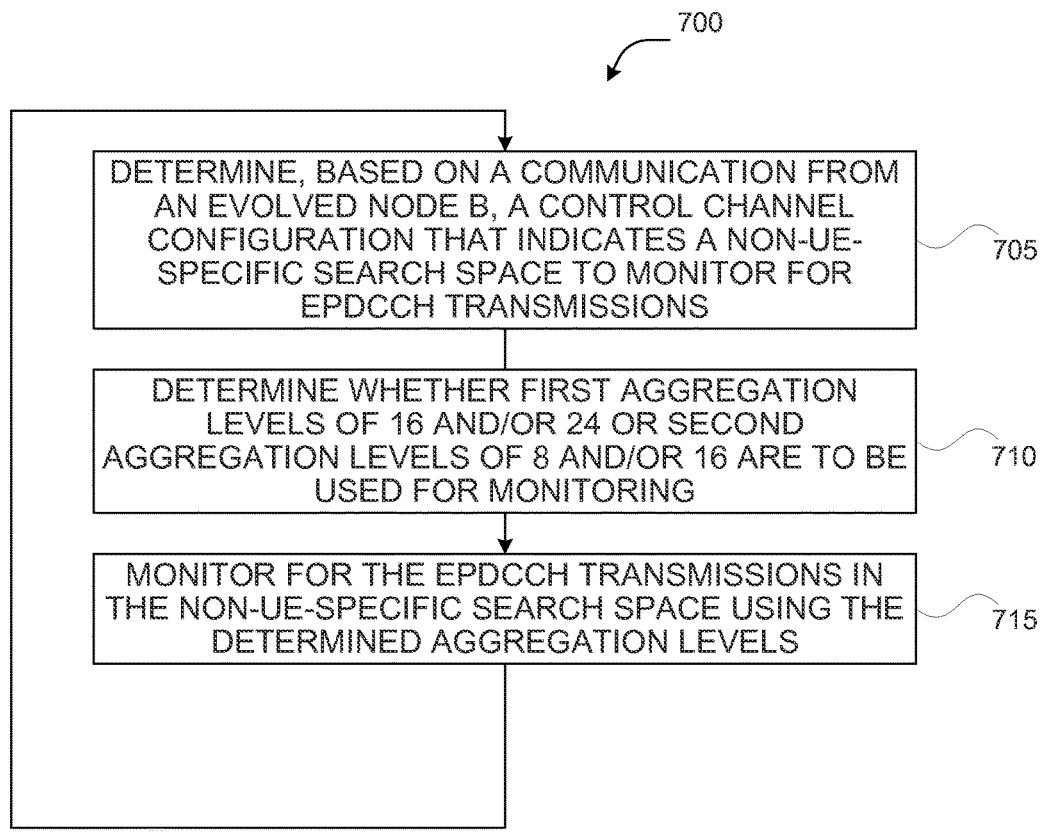
FIG. 7 illustrates another process for monitoring EPDCCH-PRB sets by a UE, in accordance with various embodiments.

FIG. 7 illustrates a process 700 that may be performed by a UE 105 to monitor an EPDCCH-PRB set in accordance with various embodiments. In some embodiments, the UE 105 may include one or more non-transitory computer-readable media having instructions, stored thereon, which when executed by the UE 105, cause the UE 105 to perform the process 700. For illustrative purposes, the operations of process 500 will be described as being performed by the UE 105, which is described with respect to FIGS. 1-3. However, it should be noted that other similar devices may operate the process 700. While particular examples and orders of operations are illustrated in FIG. 7, in various embodiments, these operations may be re-ordered, broken into additional operations, combined, and/or omitted altogether. In some embodiments, the operations illustrated in FIG. 7 may be combined with operations described with regard to other embodiments, such as those illustrated by any one of FIGS. 5-6 and 8-9.

Referring to FIG. 7, at operation 705 the UE 105 may determine, based on communication from an eNB 110, a control channel configuration that indicates a non-UE-specific SS to monitor for EPDCCH transmissions. The control channel configuration may be provided to the UE 105 by the eNB 110 during a RRC signaling procedures. For example, the UE 105 may receive the control channel configuration for a non-UE-specific search space as part of dedicated RRC signaling used to configure the UE 105. In some embodiments, the control channel configuration for the non-UE-specific search space may be provided to the UE 105 by the eNB 110 in a MIB or one or more SIBs dedicated to MTC UEs 105, for instance for EPDCCH transmissions to the UE 105 as part of its initial connection establishment procedure, which may include for example, scheduling a random access response (RAR) message or scheduling of a Contention Resolution Message (Message 4).

At operation 710, the UE 105 may determine whether a first ALs 16 and/or 24 or second ALs 8 and/or 16 are to be used for monitoring the non-UE-specific SS for EPDCCH transmissions. In various embodiments, control channel configuration may indicate the first AL or the second AL to be used for monitoring the non-UE-specific SS. In some embodiments, a selection of the first ALs or the second ALs may be indicated via a MTC SIB. In some embodiments the selection of the first ALs or the second ALs may be a function of whether the serving eNB 110 supports an enhanced coverage operation. In such embodiments, the indication of the function may be made using a spare bit of a MTC MIB.

At operation 715, the UE 105 may monitor for the EPDCCH transmissions in the non-UE-specific SS using the determined first ALs of the second ALs. In various embodiments, the UE 105 may monitor and receive the EPDCCH transmissions with a precoding granularity in a frequency dimension and/or a PRB bundling size of N PRBs in length irrespective of whether or not the UE 105 is configured with a PMI/RI, where 2≤N≤8, and/or where 2≤N ≤6 for an MTC UE 105. In some embodiments, the UE 105 may receive PDSCH transmissions based on one or more DM-RSs such that the PDSCH transmissions are assumed to be transmitted with enhanced PRB bundling. Each PRB bundle may have a PRG size, where the PRG size is a number of PRBs for which the UE 105 may assume that the precoding granularity is not changed. In such embodiments, the PRG size of each PRB bundle may be a function of a number of PRBs allocated for the PDSCH transmissions in a subframe irrespective of the system bandwidth. In other embodiments, the PRG size may be equal to a number of PRBs allocated for the PDSCH transmissions in a subframe. In the time domain, for repeated EPDCCH transmissions and/or PDSCH transmissions based on DM-RS, the UE 105 may assume that the precoding granularity is not changed within M subframes in order to enable cross-subframe channel estimation. In such embodiments, the value of M can be predefined or configured for the UE 105. Further, the value of M can be a function of the repetition level used for the EPDCCH transmissions and/or the PDSCH transmissions. In embodiments where the UE 105 is an MTC UE 105 with reduced bandwidth support, the maximum size of the PRG may be six PRBs. Furthermore, the DM-RSs may be transmitted to the UE 105 when the UE 105 is in TM 9 or TM 10. The UE 105 monitors the non-UE-specific SS for the EPDCCH transmissions according to the first ALs or the second ALs until the UE 105 determines, based on another communication from an eNB 110, another control channel configuration (also referred to as a "reconfiguration," a "control channel reconfiguration," "a new physical downlink control channel configuration," and the like) with a different and/or additional non-UE-specific SS to be monitored via an operation that is the same or similar to operation 705.

Figure 8:
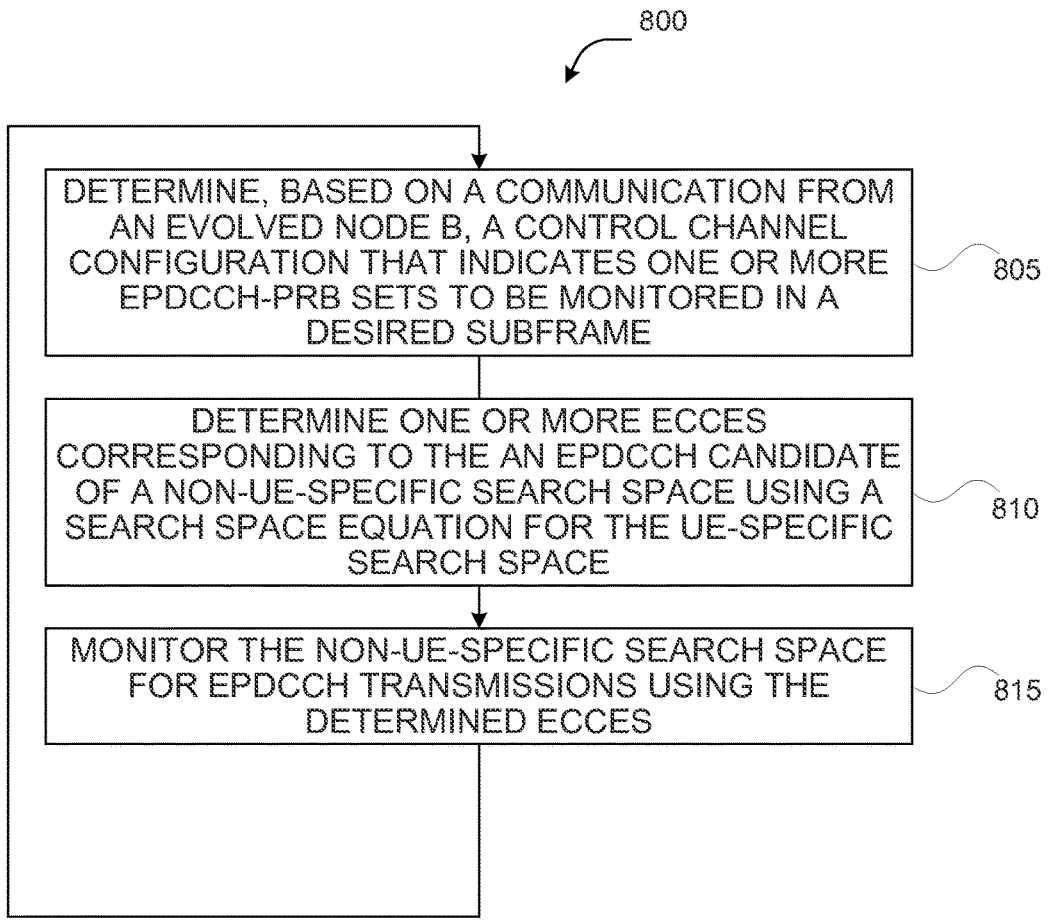
FIG. 8 illustrates another process for monitoring EPDCCH-PRB sets by a UE, in accordance with various embodiments.

FIG. 8 illustrates a process 800 that may be performed by a UE 105 to monitor an EPDCCH-PRB set in accordance with various embodiments. In some embodiments, the UE 105 may include one or more non-transitory computer-readable media having instructions, stored thereon, which when executed by the UE 105, cause the UE 105 to perform the process 800. For illustrative purposes, the operations of process 500 will be described as being performed by the UE 105, which is described with respect to FIGS. 1-3. However, it should be noted that other similar devices may operate the process 800. While particular examples and orders of operations are illustrated in FIG. 8, in various embodiments, these operations may be re-ordered, broken into additional operations, combined, and/or omitted altogether. In some embodiments, the operations illustrated in FIG. 8 may be combined with operations described with regard to other embodiments, such as those illustrated by any one of FIGS. 5-7 and 9.

Referring to FIG. 8, at operation 805, the UE 105 may determine, based on a communication from an eNB 110, a control channel configuration that indicates one or more EPDCCH-PRB sets to be monitored in a desired subframe. Operation 805 may be the same or similar as operation 505 discussed with regard to FIG. 5.

At operation 810, the UE 105 may determine one or more ECCEs corresponding to an EPDCCH candidate of a non-UE-specific SS using a search space equation for the UE-specific SS. In various embodiments, the search space equation specified for UE-specific SS may be Equation 1 discussed previously, where $Y_{p,k}=0$, b=0 and p=0, where p=0 may imply that only a single EPDCCH-PRB set is configured for the non-UE-specific SS. In some embodiments, the UE 105 may not be expected to monitor for EPDCCH transmissions in any non-UE-specific SS if an ECCE corresponding to a EPDCCH candidate is mapped to a PRB pair that overlaps in frequency with a transmission of either a PBCH or PBCH repetition blocks if the PBCH repetition blocks for enhanced coverage are transmitted by the eNB 110 and/or primary or secondary synchronization signals in the same subframe.

At operation 815, the UE 105 may monitor the non-UE-specific SS for EPDCCH transmissions using the determined ECCEs. The UE 105 monitors the non-UE-specific SS for the EPDCCH transmissions using the determined ECCEs until the UE 105 determines, based on another communication from an eNB 110, another control channel configuration (also referred to as a "reconfiguration," a "control channel reconfiguration," "a new physical downlink control channel configuration," and the like) with a different and/or additional non-UE-specific SS via an operation that is the same or similar to operation 805.

Figure 9:
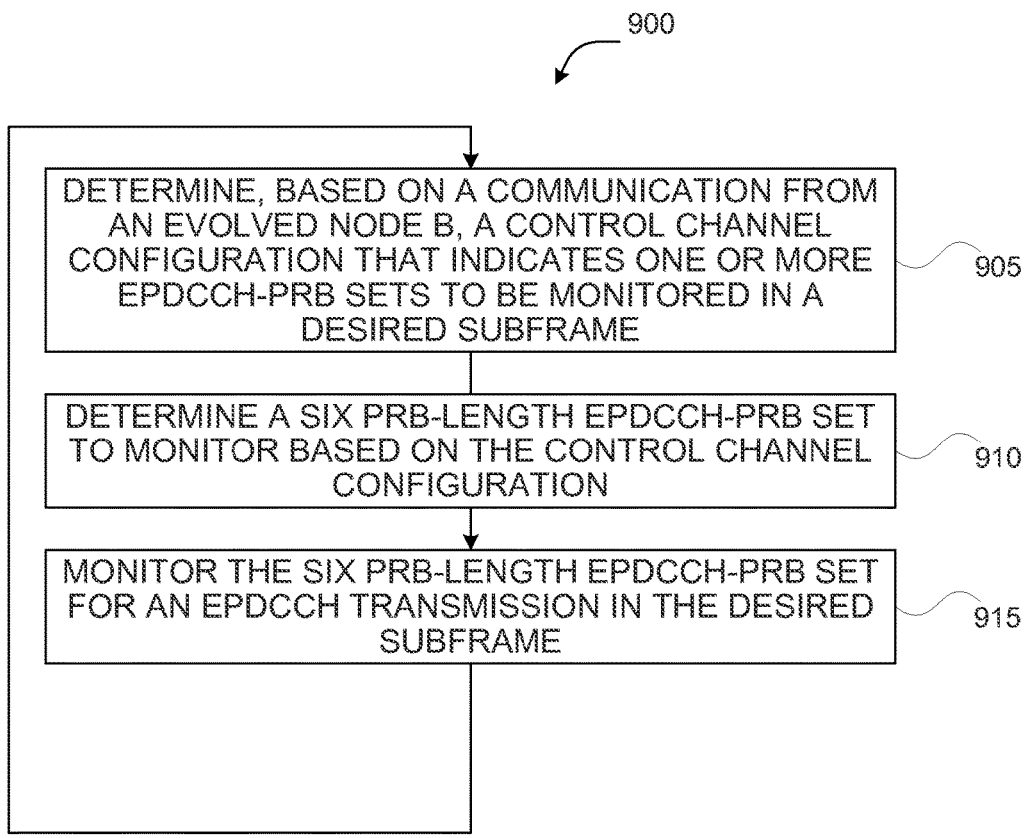
FIG. 9 illustrates another process for monitoring EPDCCH-PRB sets by a UE, in accordance with various embodiments.

FIG. 9 illustrates a process 900 that may be performed by a UE 105 to monitor an EPDCCH-PRB set in accordance with various embodiments. In some embodiments, the UE 105 may include one or more non-transitory computer-readable media having instructions, stored thereon, which when executed by the UE 105, cause the UE 105 to perform the process 800. For illustrative purposes, the operations of process 900 will be described as being performed by the UE 105, which is described with respect to FIGS. 1-3. However, it should be noted that other similar devices may operate the process 800. While particular examples and orders of operations are illustrated in FIG. 9, in various embodiments, these operations may be re-ordered, broken into additional operations, combined, and/or omitted altogether. In some embodiments, the operations illustrated in FIG. 9 may be combined with operations described with regard to other embodiments, such as those illustrated by any one of FIGS. 5-8.

Referring to FIG. 9, at operation 905, the UE 105 may determine, based on a communication from an eNB 110, a control channel configuration that indicates one or more EPDCCH-PRB sets to be monitored in a desired subframe. Operation 905 may be the same or similar as operation 505 discussed with regard to FIG. 5 and/or operation 805 discussed with regard to FIG. 8.

At operation 910, the UE 105 may determine a six PRB-length EPDCCH-PRB set to monitor. In some embodiments, the UE 105 may only determine the six PRB-length EPDCCH-PRB set to monitor for localized EPDCCH transmissions. In such embodiments, the localized EPDCCH transmissions to be monitored may belong to either case 1 or case 2 as defined in TS 36.213. In some embodiments, the EPDCCH transmissions to be monitored may be transmitted with an AL from the set {1, 2, 4, 8, 16, 24, 32} such that the UE 105 may determine to perform blind decoding at an AL from the set {1, 2, 4, 8, 16, 24, 32}. In embodiments where the UE 105 is a MTC UE 105 with reduced bandwidth support in the normal coverage mode or the enhanced coverage mode, the AL may be from the set {1, 2, 4, 8, 16, 24}. In embodiments where the UE 105 is in the enhanced coverage mode but supports the entire system bandwidth, the AL may be from the set {1, 2, 4, 8, 16, 24, 32}. In other embodiments, the set of monitored ALs may be predefined or configured at the UE 105 as a function of the amount of coverage enhancement required. In such embodiments, the predefined AL may be a subset of all ALs from the set {1, 2, 4, 8, 16, 24}. For a maximum level of coverage enhancement required for a UE 105, the ALs 16 or 24 may be used to transmit a distributed or localized EPDCCH transmissions, and the UE 105 may be preconfigured to perform blind decoding for ALs 16 or 24 when the UE 105 is in the highest enhanced coverage mode. The subset of ALs used can be indicated by one or more MTC SIBs and/or an MIB. Additionally, the EPDCCH candidates may belong to the non-UE-specific SS that is used to schedule RRC configuration for the UE-specific SS.

At operation 915, the UE 105 may monitor the six PRB-length EPDCCH-PRB set for an EPDCCH transmission in the desired subframe. The UE 105 monitors the six PRB-length EPDCCH-PRB set for EPDCCH transmissions using the determined six PRB-length EPDCCH-PRB set until the UE 105 determines, based on another communication from an eNB 110, another control channel configuration (also referred to as a "reconfiguration," a "control channel reconfiguration," "a new physical downlink control channel configuration," and the like) with a different and/or additional six PRB-length EPDCCH-PRB set to be monitored via an operation that is the same or similar to operation 905.

Furthermore, in various embodiments, a modified mapping equation for mapping ECCEs to EREGs of distributed EPDCCH transmissions may be used to determine the six PRB-length EPDCCH PRB set. In such embodiments, the mapping equation for distributed EPDCCH may be modified with a floor function in a portion of the mapping equation used to derive the used PRB indices as indicated herein.

The foregoing description of the above implementations provides illustration and description for the example embodiments, but is not intended to be exhaustive or to limit the scope of the invention to the precise form disclosed. Modifications and variations are possible in light of the above teachings and/or may be acquired from practice of various implementations of the invention. For example, the described example embodiments pertain to transmitting feedback in an uplink channel in response to receiving downlink data transmissions in an unlicensed shared medium. However, the example embodiments are may be extended to be applicable to uplink data transmissions and corresponding feedback transmission transmitted in over a downlink channel in an unlicensed shared medium.

Example 1 may include an apparatus to be employed by a user equipment (UE), the apparatus comprising one or more computer-readable storage media having instructions; and one or more processors coupled with the one or more computer-readable storage media to execute the instructions to: determine, based on a communication from an evolved Node B (eNB), a control channel configuration that indicates one or more enhanced physical downlink control channel (EPDCCH)-physical resource block (PRB) sets to be monitored in a desired subframe; and monitor at least one EPDCCH-PRB set of the one of the one or more EPDDCH-PRB sets for an EPDCCH transmission in the desired subframe to detect one or more EPDCCH candidates used to transmit EPDCCH transmissions to the UE in the desired subframe.

Example 2 may include the apparatus of example 1 and/or any other examples disclosed herein, wherein the one or more processors are to execute the instructions to monitor the at least one EPDCCH-PRB set of the one or more EPDCCH-PRB sets in the desired subframe whether the UE is in a normal coverage mode or an enhanced coverage mode.

Example 3 may include the apparatus of example 1 and/or any other examples disclosed herein, wherein the one or more processors are to execute the instructions to monitor the at least one EPDCCH-PRB set of the one or more EPDCCH-PRB sets in the desired subframe only when the UE is in an enhanced coverage mode.

Example 4 may include the apparatus of example 1 and/or any other examples disclosed herein, wherein the control channel configuration indicates the at least one EPDCCH-PRB set to be monitored for EPDCCH transmissions across a plurality of subframes, and the one or more processors are to execute the instructions to monitor the at least one EPDCCH-PRB set in each of the plurality of subframes defined by the control channel configuration.

Example 5 may include the apparatus of example 4 and/or any other examples disclosed herein, wherein an association of EPDCCH-PRB sets to subframes is defined based on a granularity of X subframes, wherein X is greater than or equal to 1 and X includes a retuning time, wherein the retuning time is a time required for the UE to switch from a first narrowband to a second narrowband.

Example 6 may include the apparatus of example 4 and/or any other examples disclosed herein, wherein the control channel configuration further indicates that the one or more EPDCCH-PRB sets are to be monitored in a UE-specific search space (SS), and wherein an association between individual ones of the one or more EPDCCH-PRB sets to individual subframes of one or more non-overlapping subframes is based on a hashing function, wherein the hashing function is based in part on a cellular radio network temporary identifier (C-RNTI) of the UE.

Example 7 may include the apparatus of example 4 and/or any other examples disclosed herein, wherein the one or more EPDCCH-PRB sets include at least one first EPDCCH-PRB set that corresponds to a UE-specific SS to be used to monitor for EPDCCH transmissions and at least one second EPDCCH-PRB set that corresponds to a non-UE-specific SS to be used to monitor for EPDCCH transmissions.

Example 8 may include the apparatus of example 7 and/or any other examples disclosed herein, wherein the one or more processors are to execute the instructions to determine the non-UE-specific SS to monitor for the second EPDCCH-PRB set using an equation that is for determining the UE-specific SS. The equation for determining the UE-specific SS may be used with a non-UE-specific SS enhanced control channel element (ECCE) starting index.

Example 9 may include the apparatus of example 7 and/or any other examples disclosed herein, wherein the one or more processors are to execute the instructions to determine, based on another control channel configuration obtained during radio resource control (RRC) signaling, the non-UE-specific SS that is to be used to monitor for EPDCCH transmissions.

Example 10 may include the apparatus of example 1 and/or any other examples disclosed herein, wherein the one or more processors are to execute the instructions to monitor and receive the EPDCCH transmissions such that a precoding granularity in a frequency dimension or a physical resource block (PRB) bundling size is N PRBs in length irrespective of whether or not the UE is configured with a precoding matrix indicator (PMI) or a rank indicator (RI), wherein $2 \leq N \leq 8$, and wherein $2 \leq N \leq 6$ when the UE is a MTC UE.

Example 11 may include the apparatus of example 10 and/or any other examples disclosed herein, wherein the one or more processors are to execute the instructions to use a same precoder for antenna port (AP) 107 and AP 109 that are used for all PRBs within each PRB bundle for distributed EPDCCH transmissions.

Example 12 may include the apparatus of example 1 and/or any other examples disclosed herein, wherein the one or more processors are to execute the instructions to receive the EPDCCH transmissions with repeated or bundled transmissions such that precoding is not changed within M subframes in order to provide for cross-subframe channel estimation, wherein the value of M is a predefined value or the value of M is a function of a repetition level used for the EPDCCH transmissions or the PDSCH transmissions.

Example 13 may include at least computer-readable medium including instructions to cause a user equipment (UE), in response to execution of the instructions by the UE, to: determine, based on a communication from an evolved Node B (eNB), a control channel configuration that indicates an enhanced physical downlink control channel (EPDCCH) to be monitored for one or more EPDCCH transmissions in a non-UE-specific search space (SS) in one or more subframes, wherein the control channel configuration for the non-UE-specific SS is to be indicated at least in part via a machine type communications (MTC) system information block (SIB) or via one or more spare bits of a master information block (MIB), and wherein the communication with the eNB is at a transmission bandwidth of 1.4 MHz; and monitor the non-UE-specific SS for the one or more EPDCCH transmissions in the one or more subframes for a duration of a contention resolution timer (CRTimer), wherein the CRTimer is to elapse upon transmission of a radio resource control (RRC) connection request message on a physical uplink shared channel (PUSCH) by the UE and the CRTimer is to terminate upon reception of a contention resolution message from the eNB. The at least computer-readable medium may be a non-transitory computer-readable medium.

Example 14 may include the at least one computer-readable medium of example 13 and/or any other examples disclosed herein, wherein one or more EPDCCH transmissions intended for the UE includes a downlink control information (DCI) message with a 16-bit cyclic redundancy check (CRC) that is scrambled with a temporary cellular radio network temporary identifier (C-RNTI), wherein the temporary C-RNTI is provided to the UE in a random access response message.

Example 15 may include the at least one computer-readable medium of example 14 and/or any other examples disclosed herein, wherein the DCI message is a format 1A DCI message for the one or more EPDCCH transmissions intended for the UE or the DCI message is a compact version of the format 1A DCI message for one or more MTC EPDCCH transmissions intended for the UE, and wherein the control circuitry is to monitor the non-UE-specific SS for only the format 1A DCI message or the compact version of the format 1A DCI message.

Example 16 may include the at least one computer-readable medium of example 13 and/or any other examples disclosed herein, wherein a value of the CRTimer is greater than 64, and the value of the CRTimer is indicative of a number of subframes to be monitored.

Example 17 may include the at least one computer-readable medium of example 13 and/or any other examples disclosed herein, wherein a value of the CRTimer is specific to the UE, and the value of the CRTimer is a function of an amount of coverage enhancement required by the UE when the UE is to operate in an enhanced coverage mode.

Example 18 may include the at least one computer-readable medium of example 13 and/or any other examples disclosed herein, wherein the instructions further cause the UE, in response to execution of the instructions by the UE, to: monitor the EPDCCH transmissions in the non-UE-specific SS for the contention resolution message without any channel state information reference signal (CSI-RS) transmissions in one or more subframes carrying the EPDCCH transmissions, and wherein the EPDCCH transmissions are to be scheduled for transmission by the eNB by puncturing EPDCCH transmissions corresponding to one or more resource elements (REs) used for transmission of the CSI-RS transmissions or the EPDCCH transmissions are to be scheduled for transmission by the eNB by rate-matching of one or more REs used for transmission of the CSI-RS transmissions from the eNB.

Example 19 may include the at least one computer-readable medium of example 13 and/or any other examples disclosed herein, wherein the instructions further cause the UE, in response to execution of the instructions by the UE, to: receive the EPDCCH transmissions in the non-UE-specific SS as distributed EPDCCH transmissions wherein the distributed EPDCCH transmissions are to be transmitted employing implementation-based pseudo-random beamforming with RE-based precoder cycling or employing diversity-based space frequency block coding (SFBC).

Example 20 may include the at least one computer-readable medium of example 13 and/or any other examples disclosed herein, wherein the instructions cause the UE, in response to execution of the instructions by the UE, to: monitor for the EPDCCH transmissions in the non-UE-specific SS such that one or more enhanced control channel elements (ECCEs) corresponding to an EPDCCH candidate within the non-UE-specific SS is derived using a search space equation specified for a UE-specific SS.

Example 21 may include the at least one computer-readable medium of example 20 and/or any other examples disclosed herein, wherein the instructions cause the UE, in response to execution of the instructions by the UE, to not monitor for the EPDCCH transmissions in the non-UE-specific SS when one or more ECCEs corresponding to the EPDCCH candidate is mapped to a physical resource block (PRB) pair that overlaps in frequency with a physical broadcast channel (PBCH) transmission or PBCH repetition blocks.

Example 22 may include an apparatus to be employed by a user equipment (UE), the apparatus comprising: one or more computer-readable storage media having instructions; and one or more processors coupled with the one or more computer-readable storage media to execute the instructions to: determine, based on a communication from an evolved Node B (eNB), a control channel configuration that indicates one or more enhanced physical downlink control channel (EPDCCH)-physical resource block (PRB) sets to be monitored; and monitor at least one EPDCCH PRB-set of the one or more EPDCCH PRB-sets for localized EPDCCH transmissions, wherein the at least one EPDCCH-PRB set is six PRBs in length, and wherein the localized EPDCCH transmissions are to be transmitted with an aggregation level (AL) from the set $\{1, 2, 4, 8, 16, 24, 32\}$.

Example 23 may include the apparatus of example 22 and/or any other examples disclosed herein, wherein the communication with the eNB is at a transmission bandwidth of 1.4 MHz when the UE is in a normal coverage mode or an enhanced coverage mode, and wherein the AL is from the set $\{1, 2, 4, 8, 16, 24\}$; or the communication with the eNB is at a transmission bandwidth of an entire system bandwidth when the UE is in the enhanced coverage mode, and wherein the AL is from the set $\{1, 2, 4, 8, 16, 24, 32\}$.

Example 24 may include the apparatus of example 22, wherein a modified mapping equation for mapping Enhanced Control Channel Elements (ECCEs) to Enhanced Resource Element Group (EREGs) for distributed EPDCCH transmissions is modified to include a floor function in an equation used to derive PRB indices.

Example 25 may include an apparatus to be employed by a user equipment (UE), the apparatus comprising: one or more computer-readable storage media having instructions; and one or more processors coupled with the one or more computer-readable storage media to execute the instructions to: determine, based on a communication from an evolved Node B (eNB), a control channel configuration that indicates a non-UE-specific search space (SS) to monitor for enhanced physical downlink control channel (EPDCCH) transmissions; and monitor for the EPDCCH transmissions in the non-UE-specific SS using only first aggregation levels (ALs) of 16 or 24 or second ALs of 8 or 16 based on the control channel configuration.

Example 26 may include the apparatus of example 25, wherein the one or more processors are to execute the instructions to indicate a selection of the first AL or the second AL via a machine type communications (MTC) system information block (SIB), or indicate a function of whether a serving cell supports an enhanced coverage operation wherein the indication of the function is made using a spare bit of a MTC master information block (MIB).

Example 27 may include an apparatus to be employed by a user equipment (UE), the apparatus comprising one or more computer-readable storage media having instructions; and one or more processors coupled with the one or more computer-readable storage media to execute the instructions to: monitor and receive the EPDCCH transmissions such that a precoding granularity in a frequency dimension or a physical resource block (PRB) bundling size is N PRBs in length irrespective of whether or not the UE is configured with a precoding matrix indicator (PMI) or a rank indicator (RI), wherein $2 \leq N \leq 8$, and wherein $2 \leq N \leq 6$ when the UE is a MTC UE.

Example 28 may include the apparatus of example 27 and/or any other examples disclosed herein, wherein the one or more processors are to execute the instructions to use a same precoder for antenna port (AP) 107 and AP 109 that are used for all PRBs within each PRB bundle for distributed EPDCCH transmissions.

Example 29 may include the apparatus of example 27 and/or any other examples disclosed herein, wherein the one or more processors are to execute the instructions to receive physical downlink shared channel (PDSCH) transmissions based on one or more demodulation reference signals (DM-RS) such that the PDSCH transmissions are assumed to be transmitted with enhanced PRB bundling wherein a PRB group (PRG) size of a PRB bundle is a function of a number of PRBs allocated for a PDSCH transmission in a subframe irrespective of a system bandwidth, and wherein the DM-RS is to be transmitted according to transmission mode (TM) 9 or TM 10.

Example 30 may include the apparatus of example 29 and/or any other examples disclosed herein, wherein the PRG size is equal to a number of PRBs allocated for PDSCH transmission in the subframe, or a maximum size of the PRG size is 6 when the UE is an MTC UE.

Example 31 may include the apparatus of example 27 and/or any other examples disclosed herein, wherein the one or more processors are to execute the instructions to receive EPDCCH transmissions with repeated or bundled transmissions such that precoding is not changed within M subframes in order to provide for cross-subframe channel estimation, wherein the value of M is a predefined value or the value of M is a function of a repetition level used for the EPDCCH transmissions or the PDSCH transmissions.

Example 32 may include at least one computer-readable medium including instructions to cause a user equipment (UE), in response to execution of the instructions by the UE, to monitor and receive the EPDCCH transmissions such that a precoding granularity in a frequency dimension or a physical resource block (PRB) bundling size is N PRBs in length irrespective of whether or not the UE is configured with a precoding matrix indicator (PMI) or a rank indicator (RI), wherein $2 \leq N \leq 8$, and wherein $2 \leq N \leq 6$ when the UE is a MTC UE.

Example 33 may include the at least one computer-readable medium of example 32 and/or any other examples disclosed herein, wherein the instructions further cause the UE, in response to execution of the instructions by the UE, to use a same precoder for antenna port (AP) 107 and AP 109 that are used for all PRBs within each PRB bundle for distributed EPDCCH transmissions.

Example 34 may include the at least one computer-readable medium of example 32 and/or any other examples disclosed herein, wherein the instructions further cause the UE, in response to execution of the instructions by the UE, to receive EPDCCH transmissions with repeated or bundled transmissions such that precoding is not changed within M subframes in order to provide for cross-subframe channel estimation, wherein the value of M is a predefined value or the value of M is a function of a repetition level used for the EPDCCH transmissions or the PDSCH transmissions.

Example 35 may include a computer-implemented method comprising: monitoring and receiving, by a user equipment (UE), EPDCCH transmissions such that a precoding granularity in a frequency dimension or a physical resource block (PRB) bundling size is N PRBs in length irrespective of whether or not the UE is configured with a precoding matrix indicator (PMI) or a rank indicator (RI), wherein $2 \leq N \leq 8$, and wherein $2 \leq N \leq 6$ when the UE is a MTC UE.

Example 36 may include the method of example 35 and/or any other examples disclosed herein further comprising: using a same precoder for antenna port (AP) 107 and AP 109 that are used for all PRBs within each PRB bundle for distributed EPDCCH transmissions.

Example 37 may include the method of example 35 and/or any other examples disclosed herein further comprising: receiving EPDCCH transmissions with repeated or bundled transmissions such that precoding is not changed within M subframes in order to provide for cross-subframe channel estimation, wherein the value of M is a predefined value or the value of M is a function of a repetition level used for the EPDCCH transmissions or the PDSCH transmissions.

Example 38 may include an apparatus to be employed by a user equipment (UE), the apparatus comprising one or more computer-readable storage media having instructions; and one or more processors coupled with the one or more computer-readable storage media to execute the instructions to receive physical downlink shared channel (PDSCH) transmissions based on one or more demodulation reference signals (DM-RS) such that the PDSCH transmissions are assumed to be transmitted with enhanced PRB bundling wherein a PRB group (PRG) size of a PRB bundle is a function of a number of PRBs allocated for a PDSCH transmission in a subframe irrespective of a system bandwidth, and wherein the DM-RS is to be transmitted according to transmission mode (TM) 9 or TM 10.

Example 39 may include the apparatus of example 38 and/or any other examples disclosed herein, wherein the PRG size is equal to a number of PRBs allocated for PDSCH transmission in the subframe, or a maximum size of the PRG size is 6 when the UE is an MTC UE.

Example 40 at least one computer-readable medium including instructions to cause a user equipment (UE), in response to execution of the instructions by the UE, to receive physical downlink shared channel (PDSCH) transmissions based on one or more demodulation reference signals (DM-RS) such that the PDSCH transmissions are assumed to be transmitted with enhanced PRB bundling wherein a PRB group (PRG) size of a PRB bundle is a function of a number of PRBs allocated for a PDSCH transmission in a subframe irrespective of a system bandwidth, and wherein the DM-RS is to be transmitted according to transmission mode (TM) 9 or TM 10.

Example 41 may include the at least one computer-readable medium of example 40 wherein the PRG size is equal to a number of PRBs allocated for PDSCH transmission in the subframe, or a maximum size of the PRG size is 6 when the UE is an MTC UE.

Example 42 may include a computer-implemented method comprising receiving, by a user equipment (UE), physical downlink shared channel (PDSCH) transmissions based on one or more demodulation reference signals (DM-RS) such that the PDSCH transmissions are assumed to be transmitted with enhanced PRB bundling wherein a PRB group (PRG) size of a PRB bundle is a function of a number of PRBs allocated for a PDSCH transmission in a subframe irrespective of a system bandwidth, and wherein the DM-RS is to be transmitted according to transmission mode (TM) 9 or TM 10.

Example 43 may include the method of example 42 wherein the PRG size is equal to a number of PRBs allocated for PDSCH transmission in the subframe, or a maximum size of the PRG size is 6 when the UE is an MTC UE.

Example 44 may include an apparatus to be employed by a user equipment (UE), the apparatus comprising one or more computer-readable storage media having instructions; and one or more processors coupled with the one or more computer-readable storage media to execute the instructions to receive EPDCCH transmissions with repeated or bundled transmissions such that precoding is not changed within M subframes in order to provide for cross-subframe channel estimation, wherein the value of M is a predefined value or the value of M is a function of a repetition level used for the EPDCCH transmissions or the PDSCH transmissions.

Example 45 may include at least one computer-readable medium including instructions to cause a user equipment (UE), in response to execution of the instructions by the UE, to receive EPDCCH transmissions with repeated or bundled transmissions such that precoding is not changed within M subframes in order to provide for cross-subframe channel estimation, wherein the value of M is a predefined value or the value of M is a function of a repetition level used for the EPDCCH transmissions or the PDSCH transmissions.

Example 46 may include a computer-implemented method comprising: receiving, by a user equipment (UE), EPDCCH transmissions with repeated or bundled transmissions such that precoding is not changed within M subframes in order to provide for cross-subframe channel estimation, wherein the value of M is a predefined value or the value of M is a function of a repetition level used for the EPDCCH transmissions or the PDSCH transmissions.

Example 47 may include a computer-implemented method, comprising: determining, by a user equipment (UE), based on a communication from an evolved Node B (eNB), a control channel configuration that indicates one or more enhanced physical downlink control channel (EPDCCH)-physical resource block (PRB) sets to be monitored in a desired subframe; and monitoring, by the UE, at least one EPDCCH-PRB set of the one of the one or more EPDDCH-PRB sets for an EPDCCH transmission in the desired subframe to detect one or more EPDCCH candidates used to transmit EPDCCH transmissions to the UE in the desired subframe.

Example 48 may include the method of example 57, wherein the instructions further cause the UE, in response to execution of the instructions by the UE, to monitor the at least one EPDCCH-PRB set of the one or more EPDCCH-PRB sets in the desired subframe whether the UE is in a normal coverage mode or an enhanced coverage mode.

Example 49 may include the method of example 47 and/or any other examples disclosed herein, wherein the instructions further cause the UE, in response to execution of the instructions by the UE, to monitor the at least one EPDCCH-PRB set of the one or more EPDCCH-PRB sets in the desired subframe only when the UE is in an enhanced coverage mode.

Example 50 may include the method of example 47 and/or any other examples disclosed herein, wherein the control channel configuration indicates the at least one EPDCCH-PRB set to be monitored for EPDCCH transmissions across a plurality of subframes, and the one or more processors are to execute the instructions to monitor the at least one EPDCCH-PRB set in each of the plurality of subframes defined by the control channel configuration.

Example 51 may include the method of example 50 and/or any other examples disclosed herein, wherein an association of EPDCCH-PRB sets to subframes is defined based on a granularity of X subframes, wherein X is greater than or equal to 1 and X includes a retuning time, wherein the retuning time is a time required for the UE to switch from a first narrowband to a second narrowband.

Example 52 may include the method of example 50 and/or any other examples disclosed herein, wherein the control channel configuration further indicates that the one or more EPDCCH-PRB sets are to be monitored in a UE-specific search space (SS), and wherein an association between individual ones of the one or more EPDCCH-PRB sets to individual subframes of one or more non-overlapping subframes is based on a hashing function, wherein the hashing function is based in part on a cellular radio network temporary identifier (C-RNTI) of the UE.

Example 53 may include the method of example 50 and/or any other examples disclosed herein, wherein the one or more EPDCCH-PRB sets include at least one first EPDCCH-PRB set that corresponds to a UE-specific SS to be used to monitor for EPDCCH transmissions and at least one second EPDCCH-PRB set that corresponds to a non-UE-specific SS to be used to monitor for EPDCCH transmissions.

Example 54 may include the method of example 53 and/or any other examples disclosed herein, wherein the instructions further cause the UE, in response to execution of the instructions by the UE, to determine the non-UE-specific SS to monitor for the second EPDCCH-PRB set using an equation that is for determining the UE-specific SS with a non-UE-specific SS enhanced control channel element (ECCE) starting index.

Example 55 may include the method of example 53 and/or any other examples disclosed herein, wherein the instructions further cause the UE, in response to execution of the instructions by the UE, to determine, based on another control channel configuration obtained during radio resource control (RRC) signaling, the non-UE-specific SS that is to be used to monitor for EPDCCH transmissions.

Example 56 may include the method of example 47 and/or any other examples disclosed herein, wherein the instructions further cause the UE, in response to execution of the instructions by the UE, to monitor and receive the EPDCCH transmissions such that a precoding granularity in a frequency dimension or a physical resource block (PRB) bundling size is N PRBs in length irrespective of whether or not the UE is configured with a precoding matrix indicator (PMI) or a rank indicator (RI), wherein $2 \leq N \leq 8$, and wherein $2 \leq N \leq 6$ when the UE is a MTC UE.

Example 57 may include the method of example 56 and/or any other examples disclosed herein, wherein the instructions further cause the UE, in response to execution of the instructions by the UE, to use a same precoder for antenna port (AP) 107 and AP 109 that are used for all PRBs within each PRB bundle for distributed EPDCCH transmissions.

Example 58 may include the method of example 47 and/or any other examples disclosed herein, wherein the instructions further cause the UE, in response to execution of the instructions by the UE, to receive the EPDCCH transmissions with repeated or bundled transmissions such that precoding is not changed within M subframes in order to provide for cross-subframe channel estimation, wherein the value of M is a predefined value or the value of M is a function of a repetition level used for the EPDCCH transmissions or the PDSCH transmissions.

Example 59 may include at least one computer-readable medium including instructions to cause a user equipment (UE), in response to execution of the instructions by the UE, to perform the method of any one or more of examples 47-58.

Example 60 may include a computer-implemented method, comprising: determining, by a user equipment (UE), based on a communication from an evolved Node B (eNB), a control channel configuration that indicates an enhanced physical downlink control channel (EPDCCH) to be monitored for one or more EPDCCH transmissions in a non-UE-specific search space (SS) in one or more subframes, wherein the control channel configuration for the non-UE-specific SS is to be indicated at least in part via a machine type communications (MTC) system information block (SIB) or via one or more spare bits of a master information block (MIB), and wherein the communication with the eNB is at a transmission bandwidth of 1.4 MHz; and monitoring, by the UE, the non-UE-specific SS for the one or more EPDCCH transmissions in the one or more subframes for a duration of a contention resolution timer (CRTimer), wherein the CRTimer is to elapse upon transmission of a radio resource control (RRC) connection request message on a physical uplink shared channel (PUSCH) by the UE and the CRTimer is to terminate upon reception of a contention resolution message from the eNB.

Example 61 may include the method of example 60 and/or any other examples disclosed herein, wherein one or more EPDCCH transmissions intended for the UE includes a downlink control information (DCI) message with a 16-bit cyclic redundancy check (CRC) that is scrambled with a temporary cellular radio network temporary identifier (C-RNTI), wherein the temporary C-RNTI is provided to the UE in a random access response message.

Example 62 may include the method of example 61 and/or any other examples disclosed herein, wherein the DCI message is a format 1A DCI message for the one or more EPDCCH transmissions intended for the UE or the DCI message is a compact version of the format 1A DCI message for one or more MTC EPDCCH transmissions intended for the UE, and wherein the control circuitry is to monitor the non-UE-specific SS for only the format 1A DCI message or the compact version of the format 1A DCI message.

Example 63 may include the method of example 60 and/or any other examples disclosed herein, wherein a value of the CRTimer is greater than 64, and the value of the CRTimer is indicative of a number of subframes to be monitored.

Example 64 may include the method of example 60 and/or any other examples disclosed herein, wherein a value of the CRTimer is specific to the UE, and the value of the CRTimer is a function of an amount of coverage enhancement required by the UE when the UE is to operate in an enhanced coverage mode.

Example 65 may include the method of example 60 and/or any other examples disclosed herein, wherein the instructions further cause the UE, in response to execution of the instructions by the UE, to: monitor the EPDCCH transmissions in the non-UE-specific SS for the contention resolution message without any channel state information reference signal (CSI-RS) transmissions in one or more subframes carrying the EPDCCCH transmissions, and wherein the EPDCCH transmissions are to be scheduled for transmission by the eNB by puncturing EPDCCH transmissions corresponding to one or more resource elements (REs) used for transmission of the CSI-RS transmissions or the EPDCCH transmissions are to be scheduled for transmission by the eNB by rate-matching of one or more REs used for transmission of the CSI-RS transmissions from the eNB.

Example 66 may include the method of example 60 and/or any other examples disclosed herein, wherein the instructions further cause the UE, in response to execution of the instructions by the UE, to: receive the EPDCCH transmissions in the non-UE-specific SS as distributed EPDCCH transmissions wherein the distributed EPDCCH transmissions are to be transmitted employing implementation-based pseudo-random beamforming with RE-based precoder cycling or employing diversity-based space frequency block coding (SFBC).

Example 67 may include the method of example 60 and/or any other examples disclosed herein, wherein the instructions cause the UE, in response to execution of the instructions by the UE, to: monitor for the EPDCCH transmissions in the non-UE-specific SS such that one or more enhanced control channel elements (ECCEs) corresponding to an EPDCCH candidate within the non-UE-specific SS is derived using a search space equation specified for a UE-specific SS.

Example 68 may include the method of example 60 and/or any other examples disclosed herein, wherein the instructions cause the UE, in response to execution of the instructions by the UE, to not monitor for the EPDCCH transmissions in the non-UE-specific SS when one or more ECCEs corresponding to the EPDCCH candidate is mapped to a physical resource block (PRB) pair that overlaps in frequency with a physical broadcast channel (PBCH) transmission or PBCH repetition blocks.

Example 69 may include at least one computer-readable medium including instructions to cause a user equipment (UE), in response to execution of the instructions by the UE, to perform the method of any one or more of example 60-68.

Example 70 may include a computer-implemented method, comprising: determining, by a user equipment (UE), based on a communication from an evolved Node B (eNB), a control channel configuration that indicates one or more enhanced physical downlink control channel (EPDCCH)-physical resource block (PRB) sets to be monitored; and monitoring, by the UE, at least one EPDCCH PRB-set of the one or more EPDCCH PRB-sets for localized EPDCCH transmissions, wherein the at least one EPDCCH-PRB set is six PRBs in length, and wherein the localized EPDCCH transmissions are to be transmitted with an aggregation level (AL) from the set {1, 2, 4, 8, 16, 24, 32}.

Example 71 may include the method of example 70 and/or any other examples disclosed herein, wherein the communication with the eNB is at a transmission bandwidth of 1.4 MHz when the UE is in a normal coverage mode or an enhanced coverage mode, and wherein the AL is from the set {1, 2, 4, 8, 16, 24}; or the communication with the eNB is at a transmission bandwidth of an entire system bandwidth when the UE is in the enhanced coverage mode, and wherein the AL is from the set {1, 2, 4, 8, 16, 24, 32}.

Example 72 may include the method of example 70 and/or any other examples disclosed herein, wherein a modified mapping equation for mapping Enhanced Control Channel Elements (ECCEs) to Enhanced Resource Element Group (EREGs) for distributed EPDCCH transmissions is modified to include a floor function in an equation used to derive PRB indices.

Example 73 may include at least one computer-readable medium including instructions to cause a user equipment (UE), in response to execution of the instructions by the UE, to perform the method of any one of example 70-72.

Example 74 may include a computer-implemented method, comprising: determine, based on a communication from an evolved Node B (eNB), a control channel configuration that indicates a non-UE-specific search space (SS) to monitor for enhanced physical downlink control channel (EPDCCH) transmissions; and monitor for the EPDCCH transmissions in the non-UE-specific SS using only first aggregation levels (ALs) of 16 or 24 or second ALs of 8 or 16 based on the control channel configuration.

Example 75 may include the method of example 74 and/or any other examples disclosed herein, wherein the one or more processors are to execute the instructions to indicate a selection of the first AL or the second AL via a machine type communications (MTC) system information block (SIB), or indicate a function of whether a serving cell supports an enhanced coverage operation wherein the indication of the function is made using a spare bit of a MTC master information block (MIB).

Example 76 may include at least one computer-readable medium including instructions to cause a user equipment (UE), in response to execution of the instructions by the UE, to perform the method of any one or more of example 74-75.

Example 77 may include an apparatus to be employed by a user equipment (UE), the apparatus comprising: one or more computer-readable storage media having instructions; and one or more processors coupled with the one or more computer-readable storage media to execute the instructions to: determine, based on a communication from an evolved Node B (eNB), a control channel configuration that indicates an enhanced physical downlink control channel (EPDCCH) to be monitored for one or more EPDCCH transmissions in a non-UE-specific search space (SS) in one or more subframes, wherein the control channel configuration for the non-UE-specific SS is to be indicated at least in part via a machine type communications (MTC) system information block (SIB) or via one or more spare bits of a master information block (MIB), and wherein the communication with the eNB is at a transmission bandwidth of 1.4 MHz; and monitor the non-UE-specific SS for the one or more EPDCCH transmissions in the one or more subframes for a duration of a contention resolution timer (CRTimer), wherein the CRTimer is to elapse upon transmission of a radio resource control (RRC) connection request message on a physical uplink shared channel (PUSCH) by the UE and the CRTimer is to terminate upon reception of a contention resolution message from the eNB.

Example 78 may include the apparatus of example 77 and/or any other examples disclosed herein, wherein one or more EPDCCH transmissions intended for the UE includes a downlink control information (DCI) message with a 16-bit cyclic redundancy check (CRC) that is scrambled with a temporary cellular radio network temporary identifier (C-RNTI), wherein the temporary C-RNTI is provided to the UE in a random access response message.

Example 79 may include the apparatus of example 78 and/or any other examples disclosed herein, wherein the DCI message is a format 1A DCI message for the one or more EPDCCH transmissions intended for the UE or the DCI message is a compact version of the format 1A DCI message for one or more MTC EPDCCH transmissions intended for the UE, and wherein the control circuitry is to monitor the non-UE-specific SS for only the format 1A DCI message or the compact version of the format 1A DCI message.

Example 80 may include the apparatus of example 77 and/or any other examples disclosed herein, wherein a value of the CRTimer is greater than 64, and the value of the CRTimer is indicative of a number of subframes to be monitored.

Example 81 may include the apparatus of example 77 and/or any other examples disclosed herein, wherein a value of the CRTimer is specific to the UE, and the value of the CRTimer is a function of an amount of coverage enhancement required by the UE when the UE is to operate in an enhanced coverage mode.

Example 82 may include the apparatus of example 77 and/or any other examples disclosed herein, wherein the one or more processors are to execute the instructions to: monitor the EPDCCH transmissions in the non-UE-specific SS for the contention resolution message without any channel state information reference signal (CSI-RS) transmissions in one or more subframes carrying the EPDCCCH transmissions, and wherein the EPDCCH transmissions are to be scheduled for transmission by the eNB by puncturing EPDCCH transmissions corresponding to one or more resource elements (REs) used for transmission of the CSI-RS transmissions or the EPDCCH transmissions are to be scheduled for transmission by the eNB by rate-matching of one or more REs used for transmission of the CSI-RS transmissions from the eNB.

Example 83 may include the apparatus of example 77 and/or any other examples disclosed herein, wherein the one or more processors are to execute the instructions to: receive the EPDCCH transmissions in the non-UE-specific SS as distributed EPDCCH transmissions wherein the distributed EPDCCH transmissions are to be transmitted employing implementation-based pseudo-random beamforming with RE-based precoder cycling or employing diversity-based space frequency block coding (SFBC).

Example 84 may include the apparatus of example 77 and/or any other examples disclosed herein, wherein the one or more processors are to execute the instructions to: monitor for the EPDCCH transmissions in the non-UE-specific SS such that one or more enhanced control channel elements (ECCEs) corresponding to an EPDCCH candidate within the non-UE-specific SS is derived using a search space equation specified for a UE-specific SS.

Example 85 may include the apparatus of example 77 and/or any other examples disclosed herein, wherein the one or more processors are to execute the instructions to not monitor for the EPDCCH transmissions in the non-UE-specific SS when one or more ECCEs corresponding to the EPDCCH candidate is mapped to a physical resource block (PRB) pair that overlaps in frequency with a physical broadcast channel (PBCH) transmission or PBCH repetition blocks.

The foregoing description of the above Examples provides illustration and description for the example embodiments disclosed herein, but the above Examples are not intended to be exhaustive or to limit the scope of the invention to the precise form disclosed. Modifications and variations are possible in light of the above teachings and/or may be acquired from practice of various implementations of the invention.

The invention claimed is:

1. An apparatus to be employed by a user equipment (UE), the apparatus comprising:
one or more computer-readable storage media having instructions; and
one or more processors coupled with the one or more computer-readable storage media to execute the instructions to:
determine, based on a communication from an evolved Node B (eNB), a control channel configuration that indicates one or more enhanced physical downlink control channel (EPDCCH)-physical resource block (PRB) sets to be monitored; and
monitor at least one EPDCCH-PRB set of the one or more EPDCCH-PRB set for localized EPDCCH transmissions, wherein the at least one EPDCCH-PRB set is six PRBs in length, and wherein:
the localized EPDCCH transmissions are to be transmitted with an aggregation level (AL) from a first set of ALs when a coverage mode of the UE is a first coverage mode from among a plurality of coverage modes,
the localized EPDCCH transmissions are to be transmitted with an AL from a second set of ALs when a coverage mode of the UE is a second coverage mode from among the plurality of coverage modes, and
the localized EPDCCH transmissions are to be transmitted with an AL from a third set of ALs when a coverage mode of the UE is a third coverage mode from among the plurality of coverage modes,
wherein the first set of ALs comprises {1, 2, 4, 8, 16, 24} when the communication with the eNB is at a transmission bandwidth of 1.4 MHz and the first coverage mode is a normal coverage mode of the plurality of coverage modes or an enhanced coverage mode of the plurality of coverage modes,
the second set of ALs comprises {1, 2, 4, 8, 16, 24, 32} when the communication with the eNB is at a transmission bandwidth of an entire system bandwidth and the second coverage mode is the enhanced coverage mode; and the third set of ALs comprises {16, 24}, and
the third coverage mode is a highest enhancement level of the plurality of coverage modes.

2. The apparatus of claim 1, wherein a modified mapping equation for mapping Enhanced Control Channel Elements (ECCEs) to Enhanced Resource Element Group (EREGs) for distributed EPDCCH transmissions is modified to include a floor function in an equation used to derive PRB indices.

3. An apparatus to be employed by a user equipment (UE), the apparatus comprising:
one or more computer-readable storage media having instructions; and
one or more processors coupled with the one or more computer-readable storage media to execute the instructions to:
determine, based on a communication from an evolved Node B (eNB), a control channel configuration that indicates a non-UE-specific search space (SS) to monitor for enhanced physical downlink control channel (EPDCCH) transmissions;
determine a coverage mode of a plurality of coverage modes in which the UE is operating, wherein the plurality of coverage modes comprises a normal coverage mode, an enhanced coverage mode, and a highest enhanced coverage mode;

determine a supported system bandwidth of the UE comprising reduced bandwidth support and entire bandwidth support;

monitor for the EPDCCH transmissions in the non-UE-specific SS only using aggregation levels (ALs) from a set of {16, 24} when the coverage mode is determined to be the highest enhanced coverage mode;

monitor for the EPDCCH transmissions in the non-UE-specific SS only using ALs from a set of {1, 2, 4, 8, 16, 24} when the supported system bandwidth is determined to be the reduced bandwidth support and the coverage mode is determined to be the enhanced coverage mode or the normal coverage mode; and monitor for the EPDCCH transmissions in the non-UE-specific SS only using ALs from a set of {1, 2, 4, 8, 16, 24, 32} when the coverage mode is determined to be the enhanced coverage mode and the supported system bandwidth is determined to be the entire bandwidth support.

4. The apparatus of claim 3, wherein a selection of the AL is indicated by a system information block (SIB) specified for machine type communications (MTC), or a function of whether a serving cell supports an enhanced coverage operation is indicated using a spare bit of an MTC master information block (MIB).

5. One or more non-transitory computer-readable media (NTCRM) comprising instructions, wherein execution of the instructions by one or more processors of a user equipment (UE) is to cause the UE to:

determine, based on a communication from an evolved NodeB (eNB), a control channel configuration that indicates two enhanced physical downlink control channel (EPDCCH)-physical resource block (PRB) sets to be monitored in a common search space (SS), wherein the two EPDCCH-PRB sets include a total of six PRB pairs;

monitor for localized EPDCCH candidates of only one EPDCCH-PRB set of the two EPDCCH-PRB sets in a single subframe at an aggregation level (AL) from a set of ALs comprising {16, 24} when the UE is in a highest enhanced coverage mode of a plurality of coverage modes and when communication with the eNB is at a transmission bandwidth of 1.4 MHz;

monitor for localized EPDCCH candidates of both EPDCCH-PRB sets of the two EPDCCH-PRB sets in the single subframe at an AL from a set of ALs comprising {1, 2, 4, 8, 16, 24} when communication with the eNB is at a transmission bandwidth of 1.4 MHz and when the UE is in a normal coverage mode of the plurality of coverage modes or an enhanced coverage mode of the plurality of coverage modes; and monitor for localized EPDCCH candidates of both EPDCCH-PRB sets of the two EPDCCH-PRB sets in the single subframe at an AL from a set of ALs comprising {1, 2, 4, 8, 16, 24, 32} when communication with the eNB is at a transmission bandwidth of an entire system bandwidth and when the UE is in the enhanced coverage mode of the plurality of coverage modes.

6. The one or more NTCRM of claim 5, wherein, to monitor the only one EPDCCH-PRB set or both EPDCCH-PRB sets, execution of the instructions is to cause the UE to:

attempt to decode one or more EPDCCH candidates of the only one EPDCCH-PRB set or both EPDCCH-PRB sets to obtain one or more EPDCCH transmissions intended for the UE.

7. The one or more NTCRM of claim 6, wherein the one or more EPDCCH transmissions intended for the UE includes a downlink control information (DCI) message with a 16-bit cyclic redundancy check (CRC) that is scrambled with a temporary cellular radio network temporary identifier (C-RNTI), wherein the temporary C-RNTI is provided to the UE in a random access response message.

8. The one or more NTCRM of claim 7, wherein DCI message is a format 1A DCI message for the one or more EPDCCH transmissions intended for the UE or the DCI message is a compact version of the format 1A DCI message for one or more machine-type communication (MTC) EPDCCH transmissions intended for the UE, and wherein execution of the instructions is to cause the UE to:

monitor the common SS for only the format 1A DCI message or the compact version of the format 1A DCI message.

9. The one or more NTCRM of claim 7, wherein execution of the instructions is to cause the UE to:

control receipt of the one or more EPDCCH transmissions in the common SS as distributed EPDCCH transmissions, wherein the distributed EPDCCH transmissions are to be transmitted employing implementation-based pseudo-random beamforming with RE-based precoder cycling or employing diversity-based space frequency block coding (SFBC).

10. The one or more NTCRM of claim 7, wherein execution of the instructions is to cause the UE to:

monitor for EPDCCH transmissions in the common SS such that one or more enhanced control channel elements (ECCEs) corresponding to an EPDCCH candidate within the common SS is derived using a search space equation specified for a UE-specific SS.

11. The one or more NTCRM of claim 5, wherein a number of EPDCCH candidates to monitor is based on a number of PRB pairs in each of the EPDCCH-PRB sets.

12. The one or more NTCRM of claim 5, wherein the control channel configuration is to indicate that the two EPDCCH-PRB sets are part of a UE-specific search space (SS), and wherein an association between individual ones of the two EPDCCH-PRB sets to individual subframes of one or more non-overlapping subframes is based on a hashing function, wherein the hashing function is based in part on a cellular radio network temporary identifier (C-RNTI) of the UE.

13. The one or more NTCRM of claim 5, wherein both of the two EPDCCH-PRB sets are used for localized EPDCCH transmissions, both of the two EPDCCH-PRB sets are used for distributed EPDCCH transmissions, or one of the two EPDCCH-PRB sets are used for localized EPDCCH transmissions and another one of the two EPDCCH-PRB sets are used for distributed EPDCCH transmissions.

14. One or more non-transitory computer-readable media (NTCRM) comprising instructions, wherein execution of the instructions by one or more processors of a user equipment (UE) is to cause the UE to:

determine, based on a communication from an evolved NodeB (eNB), a control channel configuration that indicates a common search space (SS) to monitor for enhanced physical downlink control channel (EPDCCH) transmissions;

determine a coverage mode of a plurality of coverage modes in which the UE is operating, wherein the plurality of coverage modes comprises a normal coverage mode, an enhanced coverage mode, and a highest enhanced coverage mode;

determine a system bandwidth supported by the UE to be a reduced bandwidth support and an entire bandwidth support;

monitor for the EPDCCH transmissions in the common SS at an aggregation level (AL) from a set consisting of {16, 24} when the coverage mode is the highest enhanced coverage mode;

monitor for the EPDCCH transmissions in the common SS at an AL from a set consisting of {1, 2, 4, 8, 16, 24} when the supported system bandwidth is the reduced bandwidth support and the coverage mode is the enhanced coverage mode or the normal coverage mode; and monitor for the EPDCCH transmissions in the common SS at an AL from a set consisting of {1, 2, 4, 8, 16, 24, 32} when the coverage mode is the enhanced coverage mode and the supported system bandwidth is the entire bandwidth support.

15. The one or more NTCRM of claim 14, wherein the control channel configuration is included in a system information block (SIB) specified for machine type communications (MTC) and indicates a selection of the AL, or the control channel configuration is included in a spare bit of an MTC master information block (MIB) and indicates a function of whether a serving cell supports an enhanced coverage operation.

16. The one or more NTCRM of claim 15, wherein execution of the instructions is to cause the UE to:

monitor for the EPDCCH transmissions in the common SS with a precoding granularity in a frequency dimension or a PRB bundle size of N PRBs in length regardless of whether or not a precoding matrix indicator (PMI)/rank indicator (RI) is configured, wherein $2 \leq N \leq 8$ when the supported system bandwidth is the entire bandwidth support or $2 \leq N \leq 6$ when the supported system bandwidth is the reduced bandwidth support.

17. The one or more NTCRM of claim 16, wherein execution of the instructions is to cause the UE to:

use a same precoder for antenna port 107 and antenna port 109 that are used for all PRBs within each PRB bundle for distributed EPDCCH transmissions of the EPDCCH transmissions in the common SS.

18. The one or more NTCRM of claim 15, wherein execution of the instructions is to cause the UE to:

monitor for the EPDCCH transmissions in the common SS with a PRB bundle with a PRB group (PRG) size that is a function of a number of PRBs allocated for physical downlink shared channel (PDSCH) transmissions in a subframe irrespective of the system bandwidth supported by the UE.

19. The one or more NTCRM of claim 15, wherein execution of the instructions is to cause the UE to:

monitor for the EPDCCH transmissions in the common SS with a PRB bundle with a PRG size that is equal to a number of PRBs allocated for Physical Downlink Shared Channel (PDSCH) transmissions in a subframe.

20. The one or more NTCRM of claim 14, wherein the control channel configuration indicates two EPDCCH-PRB sets, wherein each of the two EPDCCH-PRB sets include a set of PRB pairs, and a number of PRB pairs in each of the two EPDCCH-PRB sets corresponds to a number of EPDCCH candidates to monitor at the AL.

21. The one or more NTCRM of claim 20, wherein the two EPDCCH-PRB sets include a first EPDCCH-PRB set that corresponds to a UE-specific SS and a second EPDCCH-PRB set that corresponds to the common SS to be used to monitor for EPDCCH transmissions, and execution of the instructions is to cause the UE to:

determine the common SS to monitor for the second EPDCCH-PRB set using an equation that is for determining the UE-specific SS with a common SS enhanced control channel element (ECCE) starting index.

22. The one or more NTCRM of claim 20, wherein the two EPDCCH-PRB sets include an EPDCCH-PRB set for localized EPDCCH transmissions and an EPDCCH-PRB set for distributed EPDCCH transmissions, and execution of the instructions is to cause the UE to:

monitor for the EPDCCH transmissions such that a precoding granularity in a frequency dimension or a physical resource block (PRB) bundling size is N PRBs in length irrespective of whether or not the UE is configured with a precoding matrix indicator (PMI) or a rank indicator (RI), wherein $2 \leq N \leq 8$, and wherein $2 \leq N \leq 6$ when the UE is an MTC UE.

23. The one or more NTCRM of claim 22, wherein a same precoder is to be used for antenna port 107 and antenna port 109 for all PRBs within each PRB bundle for distributed EPDCCH transmissions.

24. The one or more NTCRM of claim 23, wherein execution of the instructions is to cause the UE to:

control receipt of the EPDCCH transmissions with repeated or bundled transmissions such that precoding is not changed within M subframes in order to provide for cross-subframe channel estimation, wherein M is a predefined value or M is a function of a repetition level used for the EPDCCH transmissions or physical downlink control channel (PDSCH) transmissions.

25. The one or more NTCRM of claim 14, wherein execution of the instructions is to cause the UE to:

determine to not monitor for EPDCCH candidates in the common SS if an enhanced control channel element (ECCE) corresponding to an EPDCCH candidate is mapped to a PRB pair that overlaps in frequency with a transmission of either a Physical Broadcast Channel (PBCH), PBCH repetition blocks used for enhanced coverage, or a primary synchronization signal or secondary synchronization signal in a same subframe.

\* \* \* \* \*